(12) United States Patent
Yamazaki et al.

(10) Patent No.: US 8,815,388 B2
(45) Date of Patent: Aug. 26, 2014

(54) INORGANIC-ORGANIC HYBRID MATERIAL, OPTICAL MATERIAL USING THE SAME, AND INORGANIC-ORGANIC COMPOSITE COMPOSITION

(71) Applicants: Masanori Yamazaki, Kanagawa (JP); Takahiko Takewaki, Kanagawa (JP); Ritsuko Yamauchi, Kanagawa (JP); Yuuichi Katou, Fukushima (JP); Atsushi Takaki, Fukushima (JP)

(72) Inventors: Masanori Yamazaki, Kanagawa (JP); Takahiko Takewaki, Kanagawa (JP); Ritsuko Yamauchi, Kanagawa (JP); Yuuichi Katou, Fukushima (JP); Atsushi Takaki, Fukushima (JP)

(73) Assignee: Nippon Kasei Chemical Company Limited, Iwaki-shi (JP)

( * ) Notice: Subject to any disclaimer, the term of this patent is extended or adjusted under 35 U.S.C. 154(b) by 0 days.

(21) Appl. No.: 13/727,335

(22) Filed: Dec. 26, 2012

(65) Prior Publication Data

US 2013/0116362 A1    May 9, 2013

Related U.S. Application Data

(63) Continuation of application No. PCT/JP2011/064259, filed on Jun. 22, 2011.

(30) Foreign Application Priority Data

Jun. 23, 2010    (JP) ................................ 2010-142785

(51) Int. Cl.

| | | |
|---|---|---|
| G02B 1/04 | (2006.01) | |
| C08K 3/00 | (2006.01) | |
| C08K 7/00 | (2006.01) | |
| C08L 33/02 | (2006.01) | |
| C08L 63/00 | (2006.01) | |
| C08L 83/00 | (2006.01) | |
| C08K 3/22 | (2006.01) | |
| C08F 2/44 | (2006.01) | |
| B32B 27/20 | (2006.01) | |
| C08K 5/37 | (2006.01) | |
| C08K 5/00 | (2006.01) | |

(52) U.S. Cl.
CPC ... *C08K 3/22* (2013.01); *G02B 1/04* (2013.01); *C08L 63/00* (2013.01); *C08K 5/37* (2013.01); *C08K 5/005* (2013.01); *C08K 7/00* (2013.01); *C08F 2/44* (2013.01)

USPC .......... 428/339; 428/323; 428/332; 523/440; 524/588; 524/853; 524/854; 524/881

(58) Field of Classification Search
None
See application file for complete search history.

(56) References Cited

U.S. PATENT DOCUMENTS

| | | | |
|---|---|---|---|
| 6,329,058 B1 * | 12/2001 | Arney et al. .................. | 428/403 |
| 2008/0145545 A1 * | 6/2008 | Chisholm et al. .......... | 427/385.5 |
| 2009/0208719 A1 | 8/2009 | Kang et al. | |
| 2009/0220770 A1 | 9/2009 | Ueno et al. | |
| 2011/0284354 A1 | 11/2011 | Kato et al. | |

FOREIGN PATENT DOCUMENTS

| | | |
|---|---|---|
| JP | 2000-258633 | 9/2000 |
| JP | 2002-114917 | 4/2002 |
| JP | 2007-099931 | 4/2007 |
| JP | 2007-314773 | 12/2007 |
| JP | 2008-201864 | 9/2008 |
| JP | 2009-029939 | 2/2009 |
| JP | 2009-57493 A | 3/2009 |
| JP | 2009-102550 | 5/2009 |
| JP | 2009-197131 | 9/2009 |
| JP | 2010-086743 | 4/2010 |
| JP | 2010-254800 | 11/2010 |
| WO | 2007/148684 | 12/2007 |
| WO | 2009/122661 | 10/2009 |

OTHER PUBLICATIONS

International Search Report issued Sep. 6, 2011 in PCT/JP2011/064259 filed Jun. 22, 2011.
Network Polymer, vol. 31, No. 1. 2010.
Extended European Search Report issued in corresponding European patent application No. 11 79 8175 dated Jun. 27, 2014.

* cited by examiner

*Primary Examiner* — Michael J Feely
(74) *Attorney, Agent, or Firm* — Oblon, Spivak, McClelland, Maier & Neustadt, L.L.P.

(57) ABSTRACT

The invention relates to an inorganic-organic hybrid material which comprises an inorganic component and an organic component, has a content of the inorganic component of 20-80% by mass, and has a refractive index of 1.60 or higher, wherein, when preparing a strip specimen having a thickness of 1,000 μm, a width of 5 mm and a length of 70 mm by using the inorganic-organic hybrid material and winding the specimen by 180° on a cylindrical metal rod having a diameter of 10 mm at 25° C., the specimen does not crack.

14 Claims, No Drawings

INORGANIC-ORGANIC HYBRID MATERIAL, OPTICAL MATERIAL USING THE SAME, AND INORGANIC-ORGANIC COMPOSITE COMPOSITION

TECHNICAL FIELD

The present invention relates to an inorganic-organic hybrid material which includes an inorganic component and an organic component. More particularly, the invention relates to a transparent inorganic-organic hybrid material which has a high refractive index and flexibility and in which transparent inorganic particles having a high refractive index have been evenly dispersed in order to heighten the refractive index of the radiation-cured resin, and to an inorganic-organic composite composition and an optical material which was produced using the inorganic-organic hybrid material and which is useful in lightguide sheet applications, etc.

BACKGROUND ART

In personal digital assistants including cell phones and in various instruments, input keyboards for personal computers, remote controllers, etc., film type lightguide sheets for efficiently illuminating the input key parts are being used in recent years from the standpoint of an improvement in design or an improvement in design attractiveness. LEDs are used as a light source therefor, and such a lightguide sheet is configured so that the light emitted by the LEDs disposed at an end of the lightguide sheet is transmitted through the sheet and diffused to render the input key part evenly luminous, thereby causing the whole surface to evenly shine at even brightness without reducing the luminance of the LEDs. Furthermore, since use of a lightguide sheet makes it possible to reduce the number of LED chips, a reduction in electric-power consumption and a reduction in cost are rendered possible (patent documents 1 to 3).

Meanwhile, with the trend toward performance advancement in information processing appliances and portable digital assistants, the wiring within the appliances has come to be required to attain a higher speed and to have a higher density. Optical wiring, which is capable of high-speed transmission and reduced in electromagnetic noise as compared with the conventional electrical wiring, tends to be introduced in order to meet such requirements, and film type optical waveguides are being developed enthusiastically. In order for a film type optical waveguide to be used for these purposes, the optical waveguide must be capable of transmitting light to a more distant place while minimizing light loss.

It is known that the effect of confining light is higher when the difference in refractive index between the core, which is high in refractive index, and the clad, which is low in refractive index, is larger (non-patent document 1). There is hence a desire for a transparent core material having a higher refractive index.

Known as materials having a high refractive index are, for example, cured resins represented by optical lenses and organic-inorganic hybrid materials in which inorganic particles having a high refractive index, such as, for example, a metal oxide, have been evenly dispersed on a nanometer level.

For example, patent document 4 discloses a composite material constituted of tetragonal zirconia having a size of the order of nanometer and a resin.

Patent document 5 describes an inorganic-organic composite material which includes a resin matrix and fine inorganic particles evenly dispersed therein and which is most suitable for use as optical parts having improved properties with respect to moisture resistance, transparency, and refractive index, in particular, as lenses. The patent document shows a technique in which a dispersant having a number-average molecular weight of 50-10,000 and containing carboxyl groups in a specific proportion is used in order to evenly disperse the fine inorganic particles in the resin. Furthermore, incorporation of a thermoplastic resin produced using a thiol derivative having a carboxyl group at an end is also described therein.

PRIOR-ART DOCUMENTS

Patent Documents

Patent Document 1: International Publication No. 2009/122661
Patent Document 2: JP-A-2010-86743
Patent Document 3: JP-A-2000-258633
Patent Document 4: JP-A-2007-99931
Patent Document 5: JP-A-2009-29939

Non-Patent Document

Non-Patent Document 1: *Network Polymer*, Vol. 31, No. 1, 2010

SUMMARY OF THE INVENTION

Problems that the Invention is to Solve

The composite material described in patent document 4, which is constituted of tetragonal zirconia having a size of the order of nanometer and a resin, is intended to be applied to the plastic substrate for displays which is capable of retaining a high refractive index and transparency. As a result of investigations made by the present inventors, the composite material was found to be problematic with respect to elongation in tension (tensile elongation) and to be brittle and apt to break. Consequently, the applications of the composite material are limited to coating materials and the like to be applied to substrates, and the composite material was found to be unusable as a film type lightguide sheet.

Furthermore, the investigations made by the present inventors revealed that the inorganic-organic composite material disclosed in patent document 5 has a problem that since the composite material has a low tensile elongation and is brittle and apt to break, the composite material is not applicable to members to which the present invention is intended to be applied, such as lightguide sheets and optical waveguide sheets.

An object of the invention, which has been achieved in such a situation, is to provide an inorganic-organic hybrid material which makes it possible to supply an optical material that combines flexibility and a high refractive index, which are inconsistent functions, and that has low yellowness and high transparency. Another object is to provide an inorganic-organic hybrid material which makes it possible to supply an optical material, e.g., an optical waveguide sheet, that is flexible and has a high refractive index and high transparency and that is usable as a lightguide sheet or for light transmission, etc., the lightguide sheet being capable of retaining the shape in a self-supporting manner without a reinforcing material, e.g., a substrate, and serving to increase the degree of freedom of designing final products, e.g., cell phones, and to reduce the number of light sources, e.g., LED chips, thereby attaining a reduction in electric-power consumption and a reduction in cost.

Means for Solving the Problems

The present inventors made various investigations in order to overcome the problems. As a result, the inventors have found that the problems are eliminated with an inorganic-organic composite composition which includes inorganic particles and an organic component and in which the organic component includes a specific resin and a sulfur component is contained according to need in a specific proportion. Namely, the inventors have found that a hybrid material obtained by curing the composite composition not only combines a high refractive index and flexibility, which render the material useful as an optical material for lightguide sheets or optical waveguides, but also has excellent tensile elongation, and that the hybrid material hence can be an inorganic-organic hybrid material which is less apt to break and which has low yellowness and high transparency. The invention has been thus completed.

Essential points of the invention are as follows.

[1] An inorganic-organic hybrid material which comprises an inorganic component and an organic component, has a content of the inorganic component of 20-80% by mass, and has a refractive index of 1.60 or higher, wherein, when preparing a strip specimen having a thickness of 1,000 µm, a width of 5 mm and a length of 70 mm by using the inorganic-organic hybrid material and winding the specimen by 180° on a cylindrical metal rod having a diameter of 10 mm at 25° C., the specimen does not crack.

[2] The inorganic-organic hybrid material according to [1] above, which has a total light transmittance of 80% or higher when having a thickness of 0.5 mm.

[3] The inorganic-organic hybrid material according to [1] or [2] above, wherein the inorganic component is particles which comprise a metal oxide having a refractive index of 2.0 or higher.

[4] The inorganic-organic hybrid material according to [3] above, wherein the metal oxide contains at least one member selected from the group consisting of Zr, Ti, Sn, Ce, Ta, Nb, and Zn.

[5] The inorganic-organic hybrid material according to any one of [1] to [4] above, wherein the organic component comprises at least one resin selected from the group consisting of acrylic resins, methacrylic resins, epoxy resins, and silicone resins.

[6] The inorganic-organic hybrid material according to any one of [1] to [5] above, which contains a sulfur component in an amount of 1.5-10% by mass in terms of sulfur atom amount. [7] The inorganic-organic hybrid material according to any one of [1] to [6], wherein when the inorganic-organic hybrid material having a thickness of 0.5 mm is examined with a spectrophotometer, the light which gives a transmittance of 70% has a wavelength of 400 nm or less and a difference in wavelength between the light which gives a transmittance of 70% and the light which gives a transmittance of 80% is 50 nm or less.

[8] An optical material produced from the inorganic-organic hybrid material according to any one of [1] to [7] above.

[9] An inorganic-organic composite composition which comprises: radiation-curable monomers; inorganic particles having a crystallite diameter, as calculated from the half-value width of a crystalline peak determined by X-ray diffractometry, of 1-10 nm; and a sulfur-containing organic compound, wherein the radiation-curable monomers comprise a monofunctional radiation-curable monomer and a multifunctional radiation-curable monomer, and the content of the sulfur-containing organic compound is 1.5-10% by mass in terms of sulfur atom amount.

[10] The inorganic-organic composite composition according to [9] above, wherein the content of the inorganic particles is 20-80% by mass based on the solid components of the composition.

[11] The inorganic-organic composite composition according to [9] or [10] above, wherein the proportion of the monofunctional radiation-curable monomer in the radiation-curable monomers is 1-95% by mass.

[12] The inorganic-organic composite composition according to any one of [9] to [11] above, wherein the sulfur-containing organic compound is a thiol compound.

[13] The inorganic-organic composite composition according to any one of [9] to [12] above, wherein the radiation-curable monomers include at least one monomer selected from the group consisting of acrylic monomers, methacrylic monomers, epoxy monomers, and silicone monomers.

[14] An inorganic-organic hybrid material obtained by curing the inorganic-organic composite composition according to any one of [9] to [13] above.

[15] The inorganic-organic hybrid material according to [14] above, which has a refractive index of 1.60 or higher, in which when preparing a strip specimen having a thickness of 1,000 µm, a width of 5 mm and a length of 70 mm by using the inorganic-organic hybrid material and winding the specimen by 180° on a cylindrical metal rod having a diameter of 10 mm at 25° C., the specimen does not crack.

[16] An optical material which comprises the inorganic-organic hybrid material according to [14] or [15] above.

[17] A lightguide sheet which comprises the inorganic-organic hybrid material according to [14] or [15] above.

[18] An optical waveguide sheet which comprises the inorganic-organic hybrid material according to [14] or [15].

Effects of the Invention

According to the invention, an inorganic-organic hybrid material that combines a high refractive index and flexibility, which are inconsistent functions, and is hence excellent in terms of tensile elongation and less apt to break and that has low yellowness and high transparency is provided. This inorganic-organic hybrid material can be used to provide an optical material which is useful as a lightguide sheet, optical waveguide sheet, and the like that are required in personal digital assistants, etc.

MODES FOR CARRYING OUT THE INVENTION

Embodiments of the invention are explained below in detail. However, the invention should not be construed as being limited to the following explanations, and can be variously modified within the range of the essential points thereof.

In the invention, "% by weight" and "parts by weight" have the same meanings as "% by mass" and "parts by mass", respectively.

The inorganic-organic hybrid material of the invention is an inorganic-organic hybrid material which includes an inorganic component and an organic component and which has a content of the inorganic component of 20-80% by mass and has a refractive index of 1.60 or higher. Furthermore, the inorganic-organic hybrid material of the invention satisfies the following property: when the inorganic-organic hybrid material is used to produce a strip specimen having a thickness of 1,000 μm and having no substrate and this specimen is wound on a cylindrical metal rod having a diameter of 10 mm, the specimen does not crack.

Processes for producing the inorganic-organic hybrid material of the invention, which has such properties, are not particularly limited. For example, the hybrid material can be produced by radiation-curing the inorganic-organic composite composition of the invention which is a composition that contains radiation-curable monomers, inorganic particles having a crystallite diameter, as calculated from the half-value width of a crystalline peak determined by X-ray diffractometry, of 1-10 nm, and a sulfur-containing organic compound, and in which the content of the inorganic particles based on the solid components of the composition is 20-80% by mass and the content of the sulfur-containing organic compound based on the solid components is 1.5-10% by mass in terms of sulfur atom amount.

The components of the inorganic-organic hybrid material, a process for producing the hybrid material, the inorganic-organic composite composition, processes for producing the composition, and properties of the inorganic-organic hybrid material are explained below in this order.

In the invention, the term "radiation-curable monomer" means a monomer having a functional group which is capable of undergoing radical polymerization by the action of ultraviolet rays, visible light, electron beams, or the like. Furthermore, in the invention, the term "solid components" as in the expression "the solid components of the inorganic-organic composite composition" means the sum of the components other than the solvent which is incorporated according to need into the inorganic-organic composite composition.

1. Components of the Inorganic-Organic Hybrid Material
(1) Organic Component

It is preferred that the organic component of the inorganic-organic hybrid material of the invention should be a resin which is transparent to light ranging from the ultraviolet region to the near infrared region.

The resin is not particularly limited so long as the resin is a resin obtained by polymerizing or copolymerizing one or more monomers having a functional group capable of undergoing radical polymerization by the action of radiation, heat, or the like (hereinafter referred to also as "polymerizable functional group") optionally using a polymerization initiator. From the standpoint of productivity, however, a resin obtained by polymerizing or copolymerizing one or more curable monomers capable of polymerizing with radiation (hereinafter referred to also as "radiation-curable monomers") is preferred. The radiation-curable monomers preferably are ultraviolet-curable monomers.

Although the resin may be either a resin obtained by polymerizing a monomer having one polymerizable functional group (hereinafter referred to as "monofunctional monomer") or a resin obtained by polymerizing a monomer having two or more polymerizable functional groups (hereinafter referred to as "multifunctional monomer"), it is preferred to use a resin obtained by copolymerizing two or more monomers which differ in the number of polymerizable functional groups, because the flexibility of this resin is easy to control.

With respect to the kinds of resins, it is preferred that the organic component should include at least one resin selected from acrylic resins, methacrylic resins, epoxy resins, and silicone resins, from the standpoints of enhancing transparency, refractive index, productivity, etc.

One resin selected from these resins may be used alone, or two or more resins selected therefrom may be used. In the case where two or more resins are used, the kinds of the resins to be used in combination and the ratio between these are not limited. However, from the standpoint of ease of flexibility control, it is preferred to use an acrylic resin and/or a methacrylic resin as a main component. Examples thereof include a combination of an acrylic resin and a methacrylic resin or a combination which includes an epoxy resin, a silicone resin, or both an epoxy resin and a silicone resin and in which an acrylic resin and/or a methacrylic resin is contained as a main component.

Preferred of these is an organic component which includes an acrylic resin and/or a methacrylic resin. Most preferred is a resin obtained by copolymerizing an acrylic resin and/or a methacrylic resin.

Suitable monomers for constituting the resin component are monomers having an acryloyl group, a methacryloyl group, and/or an epoxy group, etc. as a functional group capable of undergoing radical polymerization by the action of radiation.

Examples of monomers suitable for use as monomers for constituting acrylic resins, methacrylic resins, epoxy resins, and silicone resins and examples of polymerization initiators which are used according to need are shown below.

(1-i) Monomers for Constituting Acrylic Resins and/or Methacrylic Resins, and Polymerization Initiators

[Monomers]

Suitable monomers for constituting acrylic resins and methacrylic resins are monomers having an acryloyl group and/or a methacryloyl group.

The monomers having an acryloyl group and/or a methacryloyl group may be either monofunctional or multifunctional, and may be either aliphatic (including alicyclic) or aromatic. (Hereinafter, the term "(meth)acrylate" means "acrylate" or "methacrylate" or means both. The same applies to "(meth)acrylic".)

Examples of the monofunctional (meth)acrylate monomers include monofunctional aliphatic (including alicyclic) (meth)acrylate monomers and monofunctional aromatic (meth)acrylate monomers.

Examples of the multifunctional (meth)acrylate monomers include bifunctional (meth)acrylate monomers and (meth)acrylate monomers having a functionality of 3 or higher. Examples of the bifunctional (meth)acrylate monomers include bifunctional aliphatic (including alicyclic) (meth)acrylate monomers and bifunctional aromatic (meth)acrylate monomers. Examples of the (meth)acrylate monomers having a functionality of 3 or higher include multifunctional aliphatic (including alicyclic) (meth)acrylate monomers and multifunctional aromatic (meth)acrylate monomers. One of these monomers or two or more thereof can be used.

Specific examples of these monomers include the following.

<Monofunctional Aliphatic (Including Alicyclic) (Meth)acrylate Monomers>

Methyl(meth)acrylate, ethyl(meth)acrylate, propyl(meth)acrylate, n-butyl(meth)acrylate, isobutyl(meth)acrylate, t-butyl(meth)acrylate, pentyl(meth)acrylate, hexyl(meth)acrylate, 2-ethylhexyl(meth)acrylate, heptyl(meth)acrylate, octyl(meth)acrylate, allyl(meth)acrylate, methallyl(meth)acrylate, N,N-dimethylaminoethyl(meth)acrylate, N,N-dimethylaminopropyl(meth)acrylate, N,N-diethylaminoethyl(meth)acrylate, N,N-diethylaminopropyl(meth)acrylate, polyethylene glycol monoalkyl ether(meth)acrylates, polypropylene glycol monoalkyl ether(meth)acrylates, nonyl(meth)acrylate, norbornyl(meth)acrylate, decyl(meth)acrylate, 2-bromophenoxyethyl(meth)acrylate, isodecyl(meth)acrylate, dodecyl(meth)acrylate, lauryl(meth)acrylate, n-stearyl(meth)acrylate, cyclohexyl(meth)acrylate, isobornyl(meth)acrylate, tricyclodecanyl(meth)acrylate, dicyclopentenyl(meth)acrylate, adamantly (meth)acrylate, acrylonitrile, 2-hydroxyethyl(meth)acrylate, 2-hydroxypropyl(meth)acrylate, 4-hydroxybutyl(meth)acrylate, 2-hydroxybutyl(meth)acrylate, polytetramethylene glycol mono (meth)acrylate, 2-(meth)acryloyloxyethyl-2-hydroxyethylphthalic acid, glycerol mono(meth)acrylate, 2-(meth)acryloyloxyethyl 2-hydroxypropyl phthalate, hydroxy-terminated polyester mono(meth)acrylates, 3-chloro-2-hydroxypropyl(meth)acrylate, glycidyl(meth) acrylate, polypropylene glycol mono(meth)acrylate, polyethylene glycol mono(meth)acrylate, polyethylene glycol/polypropylene glycol mono(meth)acrylate, methoxypolyethylene glycol mono(meth)acrylate, octoxypolyethylene glycol/polypropylene glycol mono(meth)acrylate, 2-(meth)acryloyloxyethyl acid phosphate, mono(2-methacryloyloxyethyl) acid phosphate, mono(2-acryloyloxyethyl) acid phosphate, allyl(meth)acrylate, 2-(meth)acryloyloxyethyl acid phosphate monoester, (meth) acrylic acid, carbitol(meth)acrylate, butoxyethyl(meth)acrylate, monofunctional urethane(meth)acrylates, monofunctional epoxy(meth)acrylates, monofunctional polyester (meth)acrylates, (meth)acryloylmorpholine, and the like.

Preferred of these are the linear aliphatic(meth)acrylates, the (meth)acrylates having an ethylene glycol chain or propylene glycol chain, the hydroxyacrylates, and the acrylates containing a phosphate group.

<Monofunctional Aromatic (Meth)acrylate Monomers>

Phenyl(meth)acrylate, tetrahydrofurfuryl(meth)acrylate, phenoxy-2-methylethyl(meth)acrylate, phenoxyethoxyethyl (meth)acrylate, 3-phenoxy-2-hydroxypropyl(meth)acrylate, 2-phenylphenoxyethyl(meth)acrylate, 4-phenylphenoxyethyl(meth)acrylate, 3-(2-phenylphenyl)-2-hydroxypropyl (meth)acrylate, the (meth)acrylate of ethylene-oxide-modified p-cumylphenol, 2-bromophenoxyethyl(meth)acrylate, 2,4-dibromophenoxyethyl(meth)acrylate, 2,4,6-tribromophenoxyethyl(meth)acrylate, phenoxyethyl(meth)acrylate, 2-phenoxy-2-hydroxypropyl(meth)acrylate, 2-hydroxy-3-phenoxypropyl(meth)acrylate, benzyl(meth)acrylate, an ethylene-oxide-modified (n=2) (meth)acrylate of phenol, a propylene-oxide-modified (n=2.5) (meth)acrylate of nonylphenol, diphenyl 2-(meth)acryloyloxyethyl phosphate, o-phenylphenol glycidyl ether(meth)acrylate, the half (meth) acrylates of phthalic acid derivatives, such as 2-(meth)acryloyloxy-2-hydroxypropyl phthalate, monofunctional (meth) acrylates containing a fluorene framework, hydroxyethylated o-phenylphenol(meth)acrylates, furfuryl(meth)acrylate, and the like.

Preferred of these are phenyl(meth)acrylate, the phenoxyacrylates, and monofunctional (meth)acrylates containing a fluorene framework.

<Bifunctional Aliphatic (Including Alicyclic) (Meth)acrylate Monomers>

Neopentyl glycol di(meth)acrylate, diethylene glycol di(meth)acrylate, 1,6-hexanediol di(meth)acrylate, tripropylene glycol di(meth)acrylate, tricyclodecanedimethanol di(meth)acrylate, 1,3-adamantanediol di(meth)acrylate, glycerol di(meth)acrylate, hydroxypivalic acid neopentyl glycol di(meth)acrylate, 2-butyl-2-ethyl-1,3-propanediol di(meth)acrylate, bifunctional urethane(meth)acrylates, bifunctional epoxy(meth)acrylates, bifunctional polyester (meth)acrylates, polyethylene glycol diacrylate, polypropylene glycol di(meth)acrylate, neopentyl glycol hydroxypivalate di(meth)acrylate, trimethylolpropane di(meth)acrylate modified with neopentyl glycol, the caprolactone-modified di(meth)acrylate of neopentyl glycol hydroxypivalate, tris(2-hydroxyethyl)isocyanurate di(meth)acrylate, trimethylpropane di(meth)acrylate, trimethylolmethane di(meth)acrylate, the mono(meth)acrylate of glycerol 2-(meth)acryloyloxyethyl-2-hydroxyethylphthalate, 3-(meth)acryloyloxyglycerol mono(meth)acrylate, and the like.

<Bifunctional Aromatic (Meth)acrylate Monomers>

The di(meth)acrylate of a bisphenol A EO (epoxy) adduct, trimethylolpropane(meth)acrylate benzoate, 9,9-bis[4-(2-(meth)acryloyloxyethoxy)phenyl]fluorene, bifunctional (meth)acrylates containing a fluorene framework, bisphenol A di(meth)acrylate, the (meth)acrylate of ethylene-oxide-modified bisphenol A, the (meth)acrylate of propylene-oxide-modified bisphenol A, an epoxy(meth)acrylate obtained by reacting bisphenol A with glycidyl(meth)acrylate, an epoxy(meth)acrylate obtained by reacting ethylene-oxide-modified bisphenol A with glycidyl(meth)acrylate, an epoxy (meth)acrylate obtained by reacting propylene-oxide-modified bisphenol A with glycidyl(meth)acrylate, and the like.

<Aliphatic (Meth)acrylate Monomers Having Functionality of 3 or Higher>

Dipentaerythritol monohydroxypenta(meth)acrylate, pentaerythritol tetra(meth)acrylate, pentaerythritol tri(meth) acrylate, dipentaerythritol hexa(meth)acrylate, dipentaerythritol penta(meth)acrylate, trimethylolpropane tri(meth) acrylate, multifunctional urethane(meth)acrylates, multifunctional epoxy(meth)acrylates, multifunctional polyester(meth)acrylates, tris[2-((meth)acryloyloxy)ethyl]isocyanurate, tris[2-((meth)acryloyloxy)propyl]isocyanurate, 2,4,6-tris((meth)acryloyloxyethoxy)-1,3,5-triazine, and the like.

<Aromatic (Meth)acrylate Monomers Having Functionality of 3 or Higher>

Multifunctional (meth)acrylates containing a fluorene framework, 2,4,6-tris((meth)acryloyloxypropoxy)-1,3,5-triazine, and the like.

From the standpoint of improving heat resistance, the monofunctional aromatic (meth)acrylate monomers are especially preferred of those (meth)acrylate monomers.

Namely, to introduce aromatic rings into the molecular structure of a resin is effective for improving heat resistance. Examples of acrylate monomers into which one or more aromatic rings have been introduced and which have high heat resistance include acrylate monomers having a naphthalene structure, fluorene structure, bisphenol A structure, or the like.

Among the (meth)acrylate monomers, urethane(meth) acrylates including urethane(meth)acrylate oligomers are effective as ingredients for imparting flexibility to the inorganic-organic hybrid material to be obtained.

Among the (meth)acrylate monomers, monomers having a polar functional group can be used as the surface-treating agent for inorganic particles which will be described later. Examples of such monomers include 2-(meth)acryloyloxyethyl-2-hydroxyethylphthalic acid, 2-(meth)acryloyloxyethyl acid phosphate, mono(2-methacryloyloxyethyl) acid phosphate, mono(2-acryloyloxyethyl) acid phosphate, (meth)acrylic acid, and the half (meth)acrylates of phthalic acid derivatives, such as 2-(meth)acryloyloxy-2-hydroxypropyl phthalate.

[Polymerization Initiators]

The kinds of polymerization initiators for polymerizing those monomers are not particularly limited so long as the polymerization reactions are possible therewith. Preferred are polymerization initiators with which radical polymerization reactions can be conducted.

For example, acetophenone compounds, benzophenone compounds, benzoin ether compounds, hydroxyketone compounds, acylphosphine oxide compounds, diazonium cation onium salts, iodonium cation onium salts, sulfonium cation onium salts, and the like can be suitably used according to the kinds of the curable monomers.

Specific examples thereof include 1-[4-(2-hydroxyethoxy)phenyl]-2-hydroxy-2-methyl-1-propan-1-one, 1-hydroxycyclohexyl phenyl ketone, 2,2-dimethoxy-1,2-diphenylethan-1-one, 2,4,6-trimethylbenzoyldiphenylphosphine oxide, 2,4,6-trimethylbenzoylphenylethoxyphosphine oxide, 2-benzyl-2-dimethylamino-1-(4-morpholinophenyl)butanone-1,2-hydroxy-2-methyl-1-phenylpropan-1-one, 2-methyl-1-[4-methylthio]phenyl]-2-morpholinopropan-1-one, benzoin methyl ether, benzoin ethyl ether, benzoin isobutyl ether, benzoin isopropyl ether, bis(2,4,6-trimethylbenzoyl)phenylphosphine oxide, 2-hydroxy-2-methyl-[4-(1-methylvinyl)phenyl]propanol oligomers, isopropylthioxanthone, methyl o-benzoylbenzoate, [4-(methylphenylthio)phenyl] phenylmethane, 2,4-diethylthioxanthone, 2-chlorothioxanthone, benzophenone, ethylanthraquinone, benzophenone ammonium salt, thioxanthone ammonium salt, bis(2,6-dimethoxybenzoyl)-2,4,4-trimethylpentylphosphine oxide, 2,4,6-trimethylbenzophenone, 4-methylbenzophenone, 4,4'-bisdiethylaminobenzophenone, 1,4-dibenzoylbenzene, 10-butyl-2-chloroacridone, 2,2'-bis(o-chlorophenyl)-4,5,4',5'-tetrakis(3,4,5-trimethoxyphenyl)-1,2'-biimidazole, 2,2'-bis(o-chlorophenyl)-4,5,4',5'-tetraphenyl-1,2'-biimidazole, 2-benzoylnaphthalene, 4-benzoylbiphenyl, 4-benzoyldiphenyl ether, acrylated benzophenone, dibenzoyl, bis(η5-2,4-cyclopentadien-1-yl)bis(2,6-difluoro-3-(1H-pyrrol-1-yl)phenyl)titanium, o-methylbenzoyl benzoate, ethyl p-dimethylaminobenzoate, isoamyl ethyl p-dimethylaminobenzoate, active tertiary amines, carbazole/phenone-based photopolymerization initiators, acridine-based photopolymerization initiators, triazine-based photopolymerization initiators, benzoyl, triallyl sulfonium, hexafluorophosphate salts, phosphorus hexafluoride-based aromatic sulfonium salts, antimony hexafluoride-based aromatic sulfonium salts, triallyl sulfonium, hexafluoroantimony, 4-methylphenyl[4-(2-methylpropyl)phenyl]hexafluorophosphate (1-), 1,2-octanedione, 1-[4-(phenylthio)-2-(o-benzoyloxime)], 1-[9-ethyl-6-(2-methylbenzoyl)-9H-carbazol-3-yl]-1-(o-acetyloxime), ethyl 4-dimethylaminobenzoate, ethyl 4-dimethylaminobenzoate, 2-ethylhexyl 4-dimethylaminobenzoate, (9-oxo-9H-xanthen-2-yl)phenyliodonium hexafluorophosphate, bis[4-n-(C10-13)alkylphenyl]iodonium hexafluorophosphates, bis[4-n-(C10-13)alkylphenyl] iodonium hexafluoroantimony, triphenylsulfonium trifluorosulfonate, triphenylsulfonium bicyclo[2,2,1]heptane-1-methanesulfonate, (9-oxo-9H-xanthen-2-yl)phenylsulfonium hexafluorophosphate, p-azidobenzaldehyde, p-azidoacetophenone, p-azidobenzoic acid, p-azidobenzaldehyde-2-sulfonic acid sodium salt, p-azidobenzalacetophenone, 4,4'-diazidochalcone, 4,4'-diazidodiphenyl sulfide, 3,3'-diazidodiphenyl sulfide, 2,6-bis(4'-azidobenzal)-4-methylcyclohexane, 1,3-bis(4'-azidobenzal)propanone, 4,4'-diazidochalcone-2-sulfonic acid sodium salt, 4,4'-diazidostilbene-2,2'-disulfonic acid sodium salt, 1,3'-bis(4'-azidobenzal)-2'-(disulfonic acid sodium salt)-2-propanone, 2,6-bis(4'-azidobenzal)-2'-(sulfonic acid (sodium salt))cyclohexanone, 2,6-bis(4'-azidobenzal)-2'-(sulfonic acid (sodium salt))-4-methylcyclohexanone, α-cyano-4,4'-dibenzostilbene, 2,5-bis(4'-azidobenzalsulfonic acid sodium salt)cyclopentanone, 3-sulfonylazidobenzoic acid, 4-sulfonylazidobenzoic acid, cinnamic acid, α-cyanocinnamylideneacetonic acid, p-azido-α-cyanocinnamic acid, p-phenylenediacrylic acid, diethyl p-phenylenediacrylate, poly (vinyl cinnamate), poly(phenoxyisopropyl cinnamylideneacetate), poly(phenoxyisopropyl α-cyanocinnamylideneacetate), naphthoquinone(1,2)diazide(2)-4-sulfonic acid sodium salt, naphthoquinone(1,2)diazide(2)-5-sulfonic acid sodium salt, naphthoquinone(1,2)diazide(2)-5-sulfonic acid esters (I), naphthoquinone(1,2)diazide(2)-5-sulfonic acid esters (II), naphthoquinone(1,2)diazide(2)-4-sulfonic acid salts, 2,3,4,4'-tetrahydroxybenzophenone tri (naphthoquinonediazidesulfonic acid) ester, naphthoquinone-1,2,5-(trihydroxybenzophenone)trimesters, 1,4-iminoquinonediazide(4)-2-sulfonamide (I), 1-diazo-2,5-diethoxy-4-p-trimercaptobenzene salts, 5-nitroacenaphthene, N-acetylamino-4-nitronaphthalene, organoboron compounds, other photo-acid generators which generate a cation by the action of light, and other photo-base generators which generate an anion by the action of light. However, the polymerization initiators should not be construed as being limited to these examples. These polymerization initiators may be used alone or in combination of two or more thereof in accordance with the desired properties of the cured object.

(1-ii) Monomers for Constituting Epoxy Resins and Polymerization Initiators

[Monomers]

Monomers to be used for constituting epoxy resins are not limited so long as the monomers are compounds having one or more epoxy groups (hereinafter referred to as "epoxy monomers"). Examples thereof include bisphenol A type epoxy monomers, bisphenol F type epoxy monomers, novolac type epoxy monomers such as phenol-novolac type epoxy monomers and cresol-novolac type epoxy monomers, alicyclic epoxy monomers, nitrogenous-ring epoxy monomers such as triglycidyl isocyanurate and hydantoin epoxy monomers, hydrogenated bisphenol A type epoxy monomers, hydrogenated bisphenol F type epoxy monomers, aliphatic epoxy monomers, glycidyl ether type epoxy monomers, bisphenol S type epoxy monomers, biphenyl type epoxy monomers, dicyclic epoxy monomers, and naphthalene type epoxy monomers.

These monomers can be used alone or in combination of two or more thereof.

One or more epoxy monomers may be used as the only monomer(s), or may be used in combination with one or more other monomers which have a functional group polymerizable with the epoxy monomer(s). It is, however, preferred to use one or more epoxy monomers in combination with one or more other monomers which have a functional group polymerizable with the epoxy monomer(s).

In the case where epoxy monomers only are used, it is preferred that the epoxy monomers are a combination of a monofunctional monomer and a multifunctional monomer. In the case where one or more epoxy monomers are used in combination with one or more other monomers which have a functional group polymerizable with the epoxy monomer(s), either a monofunctional epoxy monomer or a multifunctional epoxy monomer may be used as the only epoxy monomer.

In the invention, a monomer having both a (meth)acryloyl group and an epoxy group is referred to as (meth)acrylate monomer for convenience.

[Polymerization Initiators]

As hardeners for those epoxy monomers, use can be made of known hardeners such as amine hardeners and acid anhydride hardeners. Examples of the acid anhydride hardeners include phthalic anhydride, maleic anhydride, trimellitic anhydride, pyromellitic anhydride, hexahydrophthalic anhydride, tetrahydrophthalic anhydride, methylnadic anhydride, nadic anhydride, and glutaric anhydride. One kind of hardener or two or more kinds of hardeners may be used.

(1-iii) Monomers for Constituting Silicone Resins and Polymerization Initiators

[Monomers]

Any polymerizable silicone monomers may be used as monomers for silicone resins. However, it is preferred to use, for example, silicone monomers which have therein a functional group capable of undergoing polycondensation, hydrosilylation, or the like or radiation-curable silicone monomers. Usable as these silicone monomers are silicone monomers such as dimethylsilicones, methylphenylsilicones, amino group-containing silicones, carboxy group-containing silicones, carbinol group-containing silicones, phenyl group-containing silicones, organohydrogensilicones, polycyclic-hydrocarbon-containing silicones, aromatic-hydrocarbon-containing silicones, and phenylsilsesquioxane. These monomers may be used alone or in combination of two or more thereof. Preferred of these are the radiation-curable silicone monomers.

One or more polymerizable silicone monomers may be used alone, or may be used in combination with one or more other monomers which are polymerizable with the polymerizable silicone monomer(s). It is, however, preferred to use one or more polymerizable silicone monomers in combination with one or more other monomers which are polymerizable with the polymerizable silicone monomer(s).

In the case where one or more polymerizable silicone monomers only are used, it is preferred to use a monofunctional polymerizable silicone monomer and a multifunctional polymerizable silicone monomer in combination. In the case where one or more polymerizable silicone monomers are used in combination with one or more other monomers polymerizable therewith, either a monofunctional polymerizable silicone monomer or a multifunctional polymerizable silicone monomer may be used as the only polymerizable silicone monomer.

In the invention, a silicone having a (meth)acryloyl group is referred to as polymerizable silicone monomer for convenience.

[Polymerization Initiators]

A polycondensation reaction catalyst, hydrosilylation reaction catalyst, polymerization initiator for radiation curing, or the like can be used according to the kind of the monomer.

As the polycondensation reaction catalyst, a known catalyst can be used. Examples of the hydrosilylation reaction catalyst include aluminum compounds, platinum compounds, rhodium compounds, and palladium compounds. Examples of the polymerization initiator for radiation curing include the polymerization initiators shown above which are for use in polymerizing (meth)acrylate monomers. These initiators can be used alone or in combination of two or more thereof.

Besides the monomers shown above, radiation-curable monomers having a functional group such as, for example, a vinyl group or acrylamide group may be included.

For obtaining the inorganic-organic hybrid material of the invention, which has a refractive index of 1.60 or higher, it is necessary that the refractive index of the organic material in the state of containing neither the inorganic component nor the sulfur component that will be described later should be usually 1.45 or higher, preferably 1.50 or higher, more preferably 1.55 or higher. Consequently, use of acrylic resins, which are produced from relatively various kinds of high-refractive-index monomers, is suitable.

From the standpoint of attaining both refractive index and flexibility, which are inconsistent functions to be attained by the invention, a mixture of two or more organic components can be used in an optimal range in order to attain desired performances. However, even when a combination of these is used to produce a hybrid material, it is difficult for the hybrid material to have the two properties to be attained by the invention, i.e., both flexibility and a refractive index as high as 1.60 or above. It is therefore preferred to combine the inorganic component and sulfur component which will be explained later with the organic component described above.

The proportion of the organic component contained in the inorganic-organic hybrid material of the invention, which is the remainder obtained by subtracting the contents of the inorganic component which will be described later and of various additives that are added according to need, is generally 20% by mass or more, preferably 30% by mass or more, more preferably 40% by mass or more, and is generally 80% by mass or less, preferably 70% by mass or less, more preferably 60% by mass or less.

By regulating the content of the organic component so as to be not less than the lower limit, the cured object (inorganic-organic hybrid material) to be obtained can be made to have sufficient flexibility. Furthermore, by regulating the content of the organic component so as to be not higher than the upper limit, a sufficient content of the inorganic component is ensured and the refractive-index-improving effect of the inorganic component can be sufficiently obtained.

Although ingredients such as urethane(meth)acrylates and urethane(meth)acrylate oligomers are effective in imparting flexibility as stated hereinabove, incorporation of these ingredients in a large amount not only makes it impossible to obtain a desired refractive index but also may result in insufficient dispersion of the inorganic component. It is therefore preferred to incorporate those urethane(meth)acrylate compounds in an amount of 20% by mass or less, from the standpoint of enhancing flexibility without impairing the refractive index and the dispersibility of the inorganic component.

In the invention, the flexibility, transparency, refractive index, etc. of the cured object to be obtained can be regulated by using a plurality of curable monomers in combination, as stated above. For example, from the standpoint of obtaining high flexibility, high transparency, and a high refractive index, it is preferred to use the following curable monomers in the following combinations. The proportions shown below each indicate the proportion of the curable monomer in 100% by mass the sum of the curable monomers.

TABLE 1

| | | Combination example 1 (mass %) | Combination example 2 (mass %) | Combination example 3 (mass %) |
|---|---|---|---|---|
| Mono-functional | Aliphatic acrylate | 10-60 | 10-60 | 10-60 |
| | Aromatic acrylate | 20-70 | 20-70 | 20-70 |
| Multi-functional | Aliphatic acrylate | 1-30 | 1-30 | — |
| | Aromatic acrylate | 5-50 | 5-50 | 5-50 |
| Others | Urethane acrylates | 1-20 | — | — |

(2) Inorganic Component

In the invention, an inorganic component is incorporated as a component which imparts a high refractive index to the inorganic-organic hybrid material of the invention, which is a cured object.

From the standpoint of producing a lightguide sheet or optical waveguide sheet which has a high refractive index, an inorganic component which has excellent transparency at least in the wavelength range of 400-1,100 nm and which has a refractive index that is as high as possible is preferred.

It is preferred that the inorganic component to be used in the invention should be particles of a metal oxide which has a refractive index of 2.0 or higher. It is especially preferred that the inorganic component should be particles of a metal oxide or composite metal oxide which contains at least one member selected from the group consisting of Zr, Ti, Sn, Ce, Ta, Nb, and Zn.

By using an inorganic component having a refractive index of 2.0 or higher, a satisfactory refractive-index-improving effect is obtained, making it possible to attain a refractive index of 1.60 or higher in terms of the refractive index of the hybrid material.

The refractive index of the inorganic component is more preferably 2.1 or higher, even more preferably 2.4 or higher. However, the inorganic component desirably is a metal oxide from the standpoints of colorlessness and transparency, and the refractive index of rutile titanium oxide, which is the metal oxide having the highest refractive index, is up to 2.7.

Examples of such metal oxides having a high refractive index include zirconium oxide, yttria-containing zirconium oxide, ceria-containing zirconium oxide, zircon, lead zirconate, bismuth zirconate, titanium oxide, barium titanate, strontium titanate, tin titanate, tin oxide, niobium oxide, lithium niobate, tantalum oxide, potassium tantalate, cerium oxide, and the like or these metal oxides doped with one or more other metals.

When high light transmittance, high thermal stability, etc. are especially taken into account, zirconium oxide ($ZrO_2$), titanium oxide ($TiO_2$), barium titanate ($BaTiO_3$), zinc oxide (ZnO), and the like are preferred of those.

From the standpoints of enabling the inorganic-organic hybrid material to retain high transparency and of the effect of improving refractive index, the size of the particles of the inorganic component is preferably 1 nm or larger, more preferably 2 nm or larger, especially preferably 3 nm or larger. The size thereof is preferably 10 nm or less, more preferably 8 nm or less, especially preferably 7 nm or less.

It is known that an inorganic component having a particle size smaller than 1 nm has a refractive index lower than the refractive index inherent in the inorganic particles, because of the size effect of inorganic particles. Since a sufficient difference in refractive index between this inorganic component and the organic component is not obtained, the effect of imparting refractive index is poor in this case. By using an inorganic component having a particle size of 1 nm or larger, a sufficiently large difference in refractive index between this inorganic component and the organic component is attained and a high refractive-index-imparting effect is obtained. In case where the inorganic component has too large a particle size, it is impossible to ensure transparency because of Rayleigh scattering. By regulating the particle size thereof to nm or smaller, Rayleigh scattering is prevented and high transparency can be obtained.

The size of inorganic particles can be determined from the half-value width of a crystalline peak obtained by X-ray diffractometry, using the following Scherrer equation.

$$\text{Crystallite size}(D) = K \cdot \lambda / (\beta \cdot \cos \theta) \quad \text{[Scherrer equation]}$$

In the equation, K is the Scherrer constant, and K=0.9. The wavelength ($\lambda$) of the X-rays (CuK$\alpha$1) is 1.54056 Å (1 Å=1× $10^{-10}$ m). For further heightening accuracy, it is preferred that the Bragg angle ($\theta$) attributable to CuK$\alpha$1 line and the half-value width ($\beta o$) should be calculated using the profile fitting method (Peason-XII function or Pseudo-Voigt function). It is preferred that the half-value width $\beta$ to be used in the calculation should be determined by making a correction, using the following equation, with a half-value width $\beta i$ which is attributable to the apparatus and has been determined beforehand using standard silicon.

$$\beta = \sqrt{\beta o^2 - \beta i^2} \quad \text{[Math. 1]}$$

For example, in the case where zirconium oxide, for which a production example will be described later in the section Examples, was used as a metal oxide, the primary-particle diameter thereof is substantially equal to the crystallite diameter thereof, and the particle size calculated using the Scherrer equation from the half-value width of the (111)-plane peak appearing at around $2\theta=30$ in X-ray diffractometry is 3-4 nm.

In the invention, one kind of inorganic particles may be used alone, or two or more kinds of inorganic particles differing in constituent material, size, or whether or not the particles have undergone a surface treatment or in the surface-treating agent used, etc. may be mixed together in any desired combination and proportion and used.

The proportion of the inorganic component contained in the inorganic-organic hybrid material of the invention is generally 20% by mass or more, preferably 25% by mass or more, more preferably 30% by mass or more, and is generally 80% by mass or less, preferably 60% by mass or less, more preferably 40% by mass or less. By regulating the content of the inorganic component so as to be not less than the lower limit, the effect of improving refractive index is sufficiently obtained and the hybrid material having a refractive index of 1.60 or higher is obtained. Furthermore, by regulating the content of the inorganic component so as to be not higher than the upper limit, a sufficient content of the organic component is ensured and the hybrid material can be made to have excellent flexibility.

(3) Sulfur Component

It is preferred that the inorganic-organic hybrid material of the invention should contain a sulfur component as an organic component from the standpoints of reducing the yellowness while maintaining the high refractive index of 1.60 or above and of imparting higher flexibility and a high tensile elongation. Specifically, the sulfur component preferably is a sulfur-containing organic compound. It is preferred that the sulfur-containing organic compound should be a thiol compound.

The thiol compound may be either a monofunctional thiol compound or a multifunctional thiol compound, and examples thereof include the following. However, the thiol compound should not be construed as being limited to the following examples.

<Monofunctional Thiol Compounds>

Ethanethiol, mercaptocarboxylic acids, 2-aminoethanethiol, 2-mercaptoethanol, 2-mercaptoethanesulfonic acid, 1-propanethiol, 2-propene-1-thiol, 1-butanethiol, 1-pentanethiol, 1-hexanethiol, 1-heptanethiol, 1-octanethiol, 1-nonanethiol, 1-decanethiol, 1-undecanethiol, 1-dodecanethiol, 1-hexadecanethiol, 1-octadecanethiol, 2-propanethiol, 2-methyl-1-propanethiol, 2-methyl-2-propanethiol, 2-butanethiol, 3-methyl-2-butanethiol, t-dodecanethiol, 3-mercapto-2-butanol, 3-mercapto-1,2-propanediol, 2-mercaptopropionic acid, mercaptosuccinic acid, DL-homocysteine, thioacetic acid, 3-mercapto-2-butanone, 3-mercapto-2-pentanone, methyl mercaptoacetate, ethyl mercaptoacetate, 2-ethylhexyl mercaptoacetate, isooctyl thioglycolate, 3-methoxybutyl mercaptoacetate, β-mercaptopropionic acid, methyl 3-mercaptopropionate, 2-ethylhexyl 3-mercaptopropionate, octyl 3-mercaptopropionate, methoxybutyl 3-mercaptopropionate, stearyl 3-mercaptopropionate, laurylthiopropionic acid, thioglycolic acid, methyl 3-mercaptopropionate, hexyl 3-mercaptopropionate, dodecyl 3-mercaptopropionate, tridecyl 3-mercaptopropionate, octadecyl 3-mercaptopropionate, 3-methoxybutyl 3-mercaptopropionate, cyclohexyl 3-mercaptopropionate, 2-mercaptoethyl octanoate, 2-furanmethanethiol, 2-phenylimidazole-4-carboxylic acid, 4,5-diphenyl-2-mercaptooxazole, 2-mercapto-2-thiazoline, 4-t-butyl-2-mercaptothiazole, 4,5-dimethyl-2-mercaptothiazole, 2-mercapto-4-methyl-5-thiazoleacetic acid, 1H-1,2,4-triazole-3-thiol, 3-mercapto-4-methyl-4H-1,2,4-triazole, 4-amino-3-mercapto-4H-1,2,4-triazole, 4-amino-3-mercapto-5-methyl-4H-1,2,4-triazole, 4-amino-3-mercapto-5-(trifluoromethyl)-4H-1,2,4-triazole, 4-amino-5-phenyl-4H-1,2,4-triazole-3-thiol, 4-amino-3-mercapto-5-(methoxymethyl)-4H-1,2,4-triazole, 5-(4-pyridyl)-1,3,4-oxadiazole-2-thiol, 1-methyl-1,2,3,4-tetrazole-5-thiol, 1-{2-(dimethylamino)ethyl}-1H-tetrazole-5-thiol, 5-mercapto-1-phenyltetrazole, 1-(3,4-dichlorophenyl)-5-mercapto-1H-tetrazole, 1-(m-acetamidophenyl)-5-mercapto-1H-tetrazole, 1-(p-hydroxyphenyl)-5-mercapto-1H-tetrazole, 5-mercapto-1-(p-methoxyphenyl)-1H-tetrazole, 1-(p-carbamoylphenyl)-5-mercapto-1H-tetrazole, 1-(p-carboxyphenyl)-5-mercapto-1H-tetrazole, cyclohexanethiol, 8-mercaptomenthone mixtures, thiophenol, thiobenzoic acid, o-fluorobenzenethiol, m-fluorobenzenethiol, p-fluorobenzenethiol, o-chlorothiophenol, m-chlorothiophenol, o-bromobenzenethiol, m-bromobenzenethiol, p-bromobenzenethiol, m-hydroxybenzenethiol, p-mercaptophenol, o-methoxythiophenol, m-methoxythiophenol, p-methoxythiophenol, 1,2-benzenedithiol, p-nitrobenzenethiol, 2-aminothiophenol, m-aminothiophenol, p-aminothiophenol, p-(trifluoromethyl)benzenethiol, o-methylbenzenethiol, m-methylbenzenethiol, o-isopropylbenzenethiol, p-isopropylbenzenethiol, p-t-butylthiophenol, thiosalicyclic acid, p-mercaptobenzoic acid, methyl thiosalicylate, p-mercaptophenylacetic acid, p-(trimethylsilyl)benzenethiol, 2,4-dichlorobenzenethiol, 2,6-dichlorobenzenethiol, 2-amino-4-chlorobenzenethiol, 5-fluoro-2-mercaptobenzoic acid, 2,3-dimethylbenzenethiol, 2,4-dimethylbenzenethiol, 2,5-dimethylbenzenethiol, 2,6-dimethylthiophenol, 2,5-dimethoxythiophenol, 3,5-bis(trifluoromethyl)benzenethiol, 2,4,5-trichlorobenzenethiol, pentachlorothiophenol, p-chlorophenylmethanethiol, p-fluorobenzenemethanethiol, o-methyl-α-toluenethiol, m-methyl-α-toluenethiol, (p-methylphenyl)methanethiol, 4-methoxy-α-toluenethiol, p-(trimethylsilyl)phenylmethanethiol, 1,2-benzenedimethanethiol, 1,3-benzenedimethanethiol, 1,4-benzenedimethanethiol, 2,4-bis(mercaptomethyl)-1,3,5-trimethylbenzene, triphenylmethanethiol, 2-mercaptopyridine, 4-mercaptopyridine, 2-mercapto-5-(trifluoromethyl)pyridine, 2-mercapto-5-nitropyridine, thionicotinic acid, 2-mercaptopyridine N-oxide, 2-mercaptopyrimidine, 2-thiouracil, 6-methyl-2-thiouracil, 4,6-diamino-2-mercaptopyrimidine, 4,6-dimethyl-2-mercaptopyrimidine, 4,5-diamino-6-hydroxy-2-mercaptopyrimidine, trithiocyanuric acid, 2-mercaptobenzimidazole, 2-mercapto-5-methylbenzimidazole, 5-methoxy-2-benzimidazolethiol, 5-(difluoromethoxy)-2-mercapto-1H-benzimidazole, 2-benzoxazolethiol, 6-thioguanine, 1-naphthalenethiol, 2-naphthalenethiol, 2-naphthalenemethanethiol, and the like.

<Multifunctional Thiol Compounds>

1,3-Propanedithiol, 1,4-butanedithiol, 1,5-pentanedithiol, 1,6-hexanedithiol, 1,10-decanedithiol, 2,3-butanedithiol, 2,3-dimercapto-1-propanol, ethylene glycol bis(mercaptoacetate), 1,4-butanediol bis(mercaptoacetate), trimethylolpropane tris(3-mercaptopropionate), trimethylolpropane tris(mercaptoacetate), tris{(3-mercaptopropionyloxy)ethyl}isocyanurate, pentaerythritol tetrakis(mercaptoacetate), pentaerythritol tetrakis(3-mercaptopropionate), tetraethylene glycol bis(3-mercaptopropionate), dipentaerythritol hexakis(3-mercaptopropionate), 2-{2,4,6-trioxo-3,5-bis[2-(3-sulfanilpropanoyloxy)ethyl]-1,3,5-triazinan-1-yl}ethyl 3-sulfanilpropionate, 3,3'-thiodipropionic acid, dimethyl 3,3'-thiodipropionate, dithiodipropionic acid, ethylene glycol bis(3-mercaptopropionate), 1,4-butanediol bis(3-mercaptopropionate), tetraethylene glycol bis(3-mercaptopropionate), trimethylolethane tris(3-mercaptopropionate), 4-imidazoledithiocarboxylic acid, 2-methylimidazole-4-dithiocarboxylic acid, 4-methylimidazole-5-dithiocarboxylic acid, 5-methyl-1,3,4-thiadiazole-2-thiol, 2-mercapto-5-methylthio-1,3,4-thiadiazole, 5-mercapto-3-(methylthio)-1,2,4-thiadiazole, 2,5-dimercapto-1,3,4-thiadiazole, 2-amino-5-mercapto-1,3,4-thiadiazole, 2-(5-mercapto-1,3,4-thiadiazol-2-ylthio)propionic acid, 3-(5-mercapto-1,3,4-thiadiazol-2-ylthio)propionic acid, 2-(5-mercapto-1,3,4-thiadiazol-2-ylthio)succinic acid, 2-(N-carboxymethyl-N-phenyl)amino-4,6-dimercapto-1,3,5-triazine, 6-(dibutylamino)-1,3,5-triazine-2,4-dithiol, tris {2-(3-mercaptopropionyloxy)ethyl}isocyanurate, 2-mercaptobenzothiazole, 5-chloro-2-mercaptobenzothiazole, 6-amino-2-mercaptobenzothiazole, 6-nitro-2-mercaptobenzothiazole, 2,6-dimercaptopurine, and the like.

One of these compounds may be used alone or any desired two or more thereof may be used in combination after being mixed in any desired proportion, so long as the inorganic-organic hybrid material of the invention has desired properties.

Especially from the standpoint of imparting high flexibility, multifunctional thiol compounds are preferred among those thiol compounds.

When the inorganic-organic composite composition of the invention, for example, contains the sulfur-containing organic compound described above, the inorganic-organic hybrid material of the invention contains a sulfur component in an amount, in terms of sulfur atom amount, which is preferably 1.5% by mass or more, more preferably 2.0% by mass or more, even more preferably 2.5% by mass or more, especially preferably 3.5% by mass or more, and is preferably 10% by mass or less, more preferably 9% by mass or less, especially preferably 8% by mass or less. The expression "in terms of sulfur atom amount" as used in the invention means that the amount is given in terms of the content of sulfur atoms.

When a compound having a low sulfur atom content is used as a sulfur component, the content of the sulfur component in the inorganic-organic hybrid material tends to be high so as to satisfy the content in terms of sulfur amount. In the case where the inorganic-organic hybrid material contains a sulfur component, the content of the sulfur component is generally 10% by mass or higher, preferably 15% by mass or higher, more preferably 20% by mass or higher, and is generally 50% by mass or less, preferably 40% by mass or less, more preferably 30% by mass or less.

In the case where the inorganic-organic hybrid material of the invention contains a sulfur component as part of the organic component, it is preferred that the organic component should have a composition in which the content of curable monomers is 10-70% by mass, the content of a polymerization initiator is 0.01-20% by mass, and the content of the sulfur component is 10-50% by mass.

By regulating the content of the sulfur component in the inorganic-organic hybrid material of the invention so as to be not less than the lower limit, the effect of imparting flexibility and tensile elongation and the effect of reducing yellowness which are produced by the incorporation of the sulfur component can be sufficiently obtained, thereby rendering the inorganic-organic hybrid material suitable for use as optical materials such as lightguide sheets. By regulating the content of the sulfur component so as to be not higher than the upper limit, the hybrid material can be made to have a high refractive index of 1.60 or above without lowering the refractive-index-improving effect of the inorganic component.

In the inorganic-organic hybrid material of the invention, the content of sulfur atoms is not limited at all to the content of sulfur atoms derived from the sulfur-containing organic compound. In the case where compounds containing one or more sulfur atoms were used as the polymerization initiator described above and as other additives, that sulfur atom content means the content of all sulfur atoms contained in the inorganic-organic hybrid material which include the sulfur atoms contained in these compounds.

(4) Other Additives

The inorganic-organic hybrid material of the invention may contain a nitrogen-compound, phosphorus-compound, or another antioxidant for imparting weatherability, besides the ingredients described above, i.e., a resin constituting the organic component, fine inorganic particles, and a sulfur component optionally included in the organic component. In this case, the content of the antioxidant in the inorganic-organic hybrid material is generally 0.01% by mass or higher, preferably 0.1% by mass or higher, more preferably 1% by mass or higher, and is generally 5% by mass or less, preferably 4% by mass or less, more preferably 3% by mass or less. By regulating the addition amount of the antioxidant so as to be not less than the lower limit, the resin can be prevented from discoloring or deteriorating over a long period. By regulating the amount thereof so as to be not more than the upper limit, the resin can be inhibited from suffering a decrease in transparency, a decrease in refractive index, a decrease in flexibility, etc. due to the addition of the antioxidant.

Examples of the antioxidant include 10-dihydro-9-oxa-10-phosphaphenanthrene 10-oxide.

2. Process for Producing the Inorganic-Organic Hybrid Material

The inorganic-organic hybrid material of the invention is a material which combines a high refractive index and flexibility and which has excellent tensile elongation, low yellowness, and high transparency.

In order to obtain these properties, flexibility and tensile elongation are controlled mainly by means of the proportion of the organic component and/or the sulfur component, and refractive index is controlled mainly by means of the inorganic component and the organic component. Furthermore, yellowness and transparency are controlled mainly by means of selection of the organic component and the sulfur component.

In the invention, one of the features resides in that the hybrid material combines the inconsistent performances of flexibility and a high refractive index. Although details of the mechanism are unclear, the hybrid material can be produced by suitably selecting organic materials and regulating a production process on the following lines.

For obtaining the hybrid material of the invention, it is preferred to use starting materials and a production process which are capable of having or forming a three-dimensional network structure. Although the three-dimensional network structure may be constituted of the organic component only or may be constituted of both the organic component and the inorganic component, it is preferred, from the standpoint of the dispersibility of the inorganic component, that the three-dimensional network structure should be constituted of both the organic component and the inorganic component.

Methods therefor are not limited. Examples thereof include a method in which a monomer having three or more polymerizable functional groups is included in the organic component and a method in which inorganic particles serving as the inorganic component are pretreated to thereby introduce polymerizable functional groups onto the surface of the inorganic particles. These methods may be used in combination. Preferred of these is the method in which inorganic particles serving as the inorganic component are pretreated to thereby introduce polymerizable functional groups onto the surface of the inorganic particles.

Flexibility and tensile elongation are attained by regulating the length of the molecular chain extending between crosslinking sites capable of forming a three-dimensional network structure and by regulating the crosslink density according to need. Examples of methods for regulating the length of the molecular chain extending between crosslinking sites include: (i) a method in which the monomer having three or more polymerizable functional groups which is to be used as an organic component is regulated with respect to the molecular weight of the portion lying between the functional groups; (ii) a method in which a pretreatment agent is selected when inorganic particles serving as the inorganic component are pretreated in order to introduce polymerizable functional groups onto the surface of the inorganic particles, and the length of molecular chains formed between the inorganic particles and the polymerizable functional groups is thereby regulated; (iii) a method in which a monomer having two polymerizable functional groups is mixed besides the monomer having three or more polymerizable functional groups and/or the inorganic particles having polymerizable functional groups introduced onto the surface thereof; and (iv) a method in which a reactive sulfur component such as, for example, a thiol compound having a functionality of 2 or higher is used as a sulfur component. These methods may be used alone or in combination. It is preferred to use a combination thereof.

The regulation of crosslink density may be attained by further mixing a monofunctional monomer as an additional monomer or by using a chain transfer agent. Since thiol compounds, among compounds usable as the sulfur component, serve as a chain transfer agent besides having the function of regulating the length of the molecular chain extending between crosslinking sites, it is preferred to use a thiol compound.

As described above, one feature of the invention resides in that the inorganic-organic hybrid material contains a sulfur component in a specific amount. High flexibility is obtained by this configuration. The mechanism by which the sulfur component imparts flexibility to the inorganic-organic hybrid material is thought to be based on the following two effects.

During the polymerization reaction of the radiation-curable monomers, the sulfur component is moderately incorporated into the (meth)acryloyl groups serving as polymerizable groups. As a result, the molecular weight of the resin which becomes a matrix is controlled and the monomers are inhibited from polymerizing excessively.

A large number of molecules of the reactive monomers have been adsorbed onto the surface of the inorganic particles which have been combined with the radiation-curable monomers, and the inorganic particles are bonded to one another by these monomers with the progress of the polymerization reaction. In this polymerization, the distance between the inorganic particles is regulated to a moderate value so that the reaction between the polymerizable functional groups of the monomers and the sulfur component does not result in too short a distance between the inorganic particles. Namely, the sulfur-containing organic compound to be used in the invention is not particularly limited so long as the compound is capable of controlling both the molecular weights of the radiation-curable monomers and the distance between the inorganic particles.

Meanwhile, from the standpoint of enabling the inorganic-organic composite composition to cure to give an inorganic-organic hybrid material having a refractive index of 1.60 or higher, it is preferred that atoms or functional groups which contribute to an increase in refractive index should be contained. Sulfur atoms are known to be such atoms which contribute to an increase in refractive index. Sulfur-containing organic compounds contribute also to an improvement in the refractive index of the inorganic-organic hybrid material.

Many thiol compounds, among the sulfur-containing organic compounds, produce the above-described effects on the curable monomers and the inorganic particles. It is therefore preferred to use a thiol compound.

The high refractive index of the hybrid material is attained mainly by means of the inorganic component and the sulfur component. It is preferred to use an organic component which has a high refractive index.

The inorganic-organic hybrid material of the invention can be produced by curing an inorganic-organic composite composition obtained by selecting components including the organic component and the inorganic component and further including additives and suitably regulating a method for mixing these components, on the basis of the lines shown above. Although the process for production is not limited so long as the desired properties are attained, it is preferred to produce the hybrid material by curing the following inorganic-organic composite composition of the invention.

3. Inorganic-Organic Composite Composition

The inorganic-organic composite composition of the invention is a composition which comprises radiation-curable monomers, inorganic particles having a crystallite diameter, as calculated from the half-value width of a crystalline peak determined by X-ray diffractometry, of 1-10 nm, and a sulfur-containing organic compound, and in which the radiation-curable monomers include one or more monofunctional radiation-curable monomers and one or more multifunctional radiation-curable monomers, and the content of the sulfur-containing organic compound is 1.5-10% by mass in terms of sulfur atom amount.

(1) Radiation-Curable Monomers

The radiation-curable monomers include one or more monofunctional radiation-curable monomers and one or more multifunctional radiation-curable monomers. Examples of the monofunctional radiation-curable monomers and multifunctional radiation-curable monomers include the monomers for constituting the resin component of the organic-inorganic hybrid material. It is preferred that the monofunctional monomer(s) and the multifunctional monomer(s) each should be at least one monomer selected from the group consisting of acrylic monomers, methacrylic monomers, epoxy monomers, and silicone monomers.

Preferred examples of the monomers are as follows. Examples of the acrylic monomers and methacrylic monomers include the (meth)acrylic monomers which are monomers having one or more acryloyl and/or methacryloyl groups, such as monofunctional (meth)acrylate monomers, bifunctional (meth)acrylate monomers, and multifunctional (meth)acrylate monomers. Examples of the epoxy monomers include the following epoxy monomers which are included in the epoxy monomers enumerated hereinabove: bisphenol A type epoxy monomers, bisphenol F type epoxy monomers, novolac type epoxy monomers, alicyclic epoxy monomers, nitrogenous-ring epoxy monomers, hydrogenated bisphenol A type epoxy monomers, hydrogenated bisphenol F type epoxy monomers, bisphenol S type epoxy monomers, biphenyl type epoxy monomers, dicyclic epoxy monomers, and naphthalene type epoxy monomers. Examples of the silicone monomers include the radiation-curable silicone monomers and derivatives thereof which were enumerated hereinabove as monomers for constituting silicone resins. Preferred of these are the acrylic monomers and the methacrylic monomers.

The content of the monofunctional radiation-curable monomer(s) in the radiation-curable monomers is generally 1% by mass or higher, preferably 5% by mass or higher, more preferably 10% by mass or higher, even more preferably 20% by mass or higher, especially preferably 30% by mass or higher, and is generally 99% by mass or less, preferably 95% by mass or less, more preferably 90% by mass or less, even more preferably 80% by mass or less.

It is preferred that the proportion of the monofunctional radiation-curable monomer(s) should be larger than the proportion of the multifunctional radiation-curable monomer(s).

The proportion of the radiation-curable monomers to the solid components of the inorganic-organic composite composition of the invention is generally 20% by mass or more, preferably 30% by mass or more, more preferably 40% by mass or more, and is generally 80% by mass or less, preferably 70% by mass or less, more preferably 60% by mass or less, for the same reasons as for the content of the radiation-curable monomers contained in the inorganic-organic hybrid material.

With respect to urethane(meth)acrylates, it is preferred that the content thereof should be 20% by mass or less based on the solid components of the inorganic-organic composite composition.

Especially preferred combinations of curable monomers for the inorganic-organic hybrid material are the combinations shown in Table 1.

(2) Inorganic Particles Having Crystallite Diameter Calculated from Half-Value Width of Crystalline Peak Determined by X-Ray Diffractometry of 1-10 nm The inorganic particles in the inorganic-organic composite composition are the same component as the inorganic particles contained in the inorganic-organic hybrid material, and are inorganic particles which have a crystallite diameter, as calculated from the half-value width of a crystalline peak determined by X-ray diffractometry, of 1-10 nm. The crystallite diameter is determined by the same method as in the inorganic-organic hybrid material.

The content of the inorganic particles based on the solid components of the inorganic-organic composite composition of the invention is generally 20% by mass or higher, preferably 25% by mass or higher, more preferably 30% by mass or higher, and is generally 80% by mass or less, preferably 60% by mass or less, more preferably 40% by mass or less, for the same reasons as for the content of the inorganic particles contained in the inorganic-organic hybrid material.

Processes for producing the inorganic particles according to the invention are not particularly limited. A process therefor can be suitably selected from known methods such as a solvothermal method conducted in an alcohol solvent, a method in which an alkoxide that is a starting material for an oxide is sprayed and pyrolyzed in a vapor phase, a method in which a metal oxide is directly pulverized, and a method in which a metal oxide precursor is pyrolyzed in a high-boiling solvent.

(3) Surface-Treating Agent for the Inorganic Particles

It is preferred that a surface treatment should be conducted in order to evenly disperse the inorganic particles in the organic component.

In this case, surface modifiers in general use, such as coupling agents, e.g., silane coupling agents, and modified silicones, can be used as surface-treating agents. Also usable besides such surface modifiers are organic acids having a carboxyl, sulfonyl, or phosphoryl group or the like and derivatives of the acids. Specific examples thereof are shown below, but usable surface-treating agents should not be construed as being limited to the following examples.

Examples of the silane coupling agents include alkoxysilane coupling agents, vinylsilane coupling agents, epoxysilane coupling agents, styrylsilane coupling agents, aminosilane coupling agents, acryloxysilane coupling agents, methacryloxysilane coupling agents, and mercaptosilane coupling agents.

Examples of the alkoxysilane coupling agents include methyltrimethoxysilane, methyltriethoxysilane, phenyltriethoxysilane methylmethoxysilane, n-propyltrimethoxysilane, n-butyltriethoxysilane, n-hexyltrimethoxysilane, n-hexyltriethoxysilane, n-octyltriethoxysilane, n-decyltrimethoxysilane, phenyltrimethoxysilane, and diphenyldimethoxysilane.

Examples of the vinylsilane coupling agents include vinyltrimethoxysilane and vinyltriethoxysilane.

Examples of the epoxysilane coupling agents include 3-glycidoxypropyltrimethoxysilane and 2-(3,4-epoxycyclohexyl)ethyltrimethoxysilane.

Examples of the styrylsilane coupling agents include p-styryltrimethoxysilane.

Examples of the aminosilane coupling agents include 3-aminopropyltrimethoxysilane and N-2-(aminoethyl)-3-aminopropylmethyldimethoxysilane.

Examples of the acryloxysilane coupling agents include 3-acryloxypropyltrimethoxysilane and 3-acryloxypropyldimethylmethoxysilane.

Examples of the methacryloxysilane coupling agents include 3-methacryloxypropyltrimethoxysilane and 3-methacryloxypropyldimethylmethoxysilane.

Examples of the mercaptosilane coupling agents include 3-mercaptopropyltrimethoxysilane, 3-mercaptopropyltriethoxysilane, 3-mercaptopropyldimethylmethoxysilane, and 3-mercaptopropyldiethylethoxysilane.

Besides the coupling agents shown above, other coupling agents such as, for example, titanate coupling agents and aluminate coupling agents can be used.

Examples of the modified silicones include epoxy-modified silicones, epoxy/polyether-modified silicones, methacrylic-modified silicones, phenol-modified silicones, methylstyryl-modified silicones, acrylic-modified silicones, alkoxy-modified silicones, and methylhydrogensilicones.

Examples of the organic acids having a carboxyl, sulfonyl, or phosphoryl group or the like and the derivatives thereof include saturated fatty acids such as formic acid, acetic acid, propionic acid, butyric acid, valeric acid, caproic acid, enanthic acid, caprylic acid, pelargonic acid, capric acid, lauric acid, myristic acid, palmitic acid, and stearic acid, unsaturated fatty acids such as acrylic acid, methacrylic acid, crotonic acid, oleic acid, and elaidic acid, and derivatives of these acids. Examples thereof further include: aromatic carboxylic acids such as benzoic acid, phthalic acid, isophthalic acid, terephthalic acid, hemimellitic acid, trimellitic acid, trimesic acid, mellophanic acid, prehnitic acid, mellitic acid, pyromellitic acid, diphenic acid, toluic acid, xylylic acid, hemellitic acid, mesitylenic acid, prehenitylic acid, durylic acid, isodurylic acid, cumic acid, uvitic acid, atropic acid, hydroatropic acid, cinnamic acid, hydrocinnamic acid, salicylic acid, anisic acid, veratic acid, hemipinic acid, asarylic acid, mandelic acid, homoanisic acid, homoveratic acid, homophthalic acid, homoisophthalic acid, homoterephthalic acid, phthalonic acid, isophthalonic acid, terephthalonic acid, benzilic acid, atrolactinic acid, tropic acid, adamantanecarboxylic acid, adamantanedicarboxylic acid, ibuprofen, ketoprofen, and felbinac and derivatives of these acids; and 2-acryloyloxyhexahydrophthalates, EO (ethylene oxide)-modified phosphoric acid acrylates, EO-modified phosphoric acid methacrylates, EO-modified phosphoric acid diacrylates, EO-modified phosphoric acid dimethacrylates, EO-modified phosphoric acid triacrylates, EO-modified phosphoric acid trimethacrylates, EO-modified succinic acid acrylates, EO-modified succinic acid methacrylates, EO-modified phthalic acid methacrylates, 2,2,2-trisacryloyloxymethylethylsuccinic acid, β-acryloyloxyethyl hydrogen succinate, 2-acryloyloxyethylphthalic acid, acid-modified epoxyacrylates, phenylphosphonic acid, 2-ethylhexyl phosphate, diphenyl phosphate, dibenzyl phosphate, the di(polyethylene glycol 4-nonylphenyl)ester of phosphoric acid, di-n-decyl phosphate, butyl phosphate, isopropyl phosphate, EO-modified phosphoric acid dimethacrylates, EO-modified phosphoric acid methacrylates, dodecylbenzenesulfonic acid, 4-sulfophthalic acid, 5-sulfosalicylic acid, 4-vinylbenzilic acid, o-carboxypolycaprolactone monoacrylate, 2-acrylamido-2-methylpropanesulfonic acid, and dodecylbenzenesulfonic acid.

As stated above, a (meth)acrylate monomer having a polar functional group therein, among the radiation-curable monomers contained in the inorganic-organic composite composition of the invention, can be used also as a surface-treating agent.

Those surface-treating agents may be used either alone or in combination of two or more thereof so long as the inorganic-organic hybrid material of the invention has the desired properties.

Examples of methods for treating the surface of the inorganic particles, e.g., metal oxide particles, using the surface-treating agent include a wet method and a dry method. The wet method is a method in which a surface-treating agent and inorganic particles are introduced into a solvent and mixed together to thereby treat the surface of the inorganic particles, while the dry method is a method in which a surface-treating agent and dried inorganic particles are introduced into a dry-process mixing machine, e.g., a mixer, and mixed together to thereby treat the surface of the inorganic particles. From the standpoint of inhibiting the nanometer-size particles from aggregating, a surface treatment by the wet method is suitable. Conditions for the surface treatment can be suitably selected from known surface treatment methods and used to conduct the treatment.

(4) Sulfur-Containing Organic Compound

The sulfur-containing organic compound is the same as the sulfur-containing organic compound contained in the inorganic-organic hybrid material. It is preferred that the sulfur-containing organic compound should be a thiol compound. The thiol compound may be either a monofunctional thiol compound or a multifunctional thiol compound.

The content of the sulfur-containing organic compound, in terms of sulfur atom amount based on the solid components of the inorganic-organic composite composition of the invention, is 1.5% by mass or higher, preferably 2.0% by mass or higher, more preferably 2.5% by mass or higher, even more preferably 3.5% by mass or higher, and is 10% by mass or less, preferably 9% by mass or less, more preferably 8% by mass or less, for the same reasons as for the content of the sulfur-containing compound contained in the inorganic-organic hybrid material.

Incidentally, when a compound having a low sulfur atom content is used as a sulfur-containing organic compound, the content of the sulfur-containing organic compound in the inorganic-organic composite composition tends to be high. The content of the sulfur-containing organic compound based on the solid components of the inorganic-organic composite composition is generally 10% by mass or higher, preferably 15% by mass or higher, more preferably 20% by mass or higher, and is generally 50% by mass or less, preferably 40% by mass or less, more preferably 30% by mass or less. From the standpoint of ensuring a sulfur atom content while keeping the content of the sulfur-containing organic compound low, it is preferred that the sulfur-containing organic compound should be a multifunctional sulfur-containing organic compound.

In the inorganic-organic composite composition of the invention, the content of sulfur atoms is not limited at all to the content of sulfur atoms derived from the sulfur-containing organic compound. In the case where compounds containing one or more sulfur atoms were used as the polymerization initiator described above and as other additives, that sulfur atom content means the content of all sulfur atoms contained in the inorganic-organic composite composition which include the sulfur atoms contained in these compounds.

(5) Polymerization Initiator

The inorganic-organic composite composition of the invention usually contains a polymerization initiator so as to enable the radiation-curable monomers to undergo a polymerization reaction. As the polymerization initiator, use may be made of any of the polymerization initiators for radiation-curable monomers among the polymerization initiators usable for the resin which constitutes the organic component of the inorganic-organic hybrid material.

The amount of the polymerization initiator is an important factor in determining the properties of the inorganic-organic hybrid material of the invention. Usually, the amount thereof based on the solid components of the inorganic-organic composite composition is generally 0.01% by mass or more, preferably 0.1% by mass or more, more preferably 1% by mass or more, and is generally 20% by mass or less, preferably 10% by mass or less, more preferably 5% by mass or less. By using the polymerization initiator in an amount not less than the lower limit, a sufficient refractive index and sufficient mechanical strength are obtained while preventing a curing failure or dissolution of an unreacted ingredient. When the polymerization initiator is used in an amount not more than the upper limit, the polymerization initiator does not cause coloring of the cured object, etc., does not show insufficient solubility in the resin composition, and does not cause troubles such as phase separation in which the inorganic particles separate out in the composition. Furthermore, the resultant cured object neither is opaque nor has undergone embrittlement, etc., and the inorganic particles can be evenly dispersed in the composition. Thus, a cured object which is excellent in terms of flexibility and transparency can be obtained.

(6) Other Components

The inorganic-organic composite composition of the invention may contain a nitrogen-compound, phosphorus-compound, or another antioxidant for imparting weatherability, besides the ingredients described above, i.e., radiation-curable monomers, inorganic particles, a sulfur-containing organic compound, and a polymerization initiator, which is used according to need. In this case, the content of the antioxidant in the inorganic-organic composite composition based on the solid components is generally 0.01% by mass or higher, preferably 0.1% by mass or higher, more preferably 1% by mass or higher, and is generally 5% by mass or less, preferably 4% by mass or less, more preferably 3% by mass or less. By regulating the addition amount of the antioxidant so as to be not less than the lower limit, the resin can be prevented from discoloring or deteriorating over a long period. By regulating the amount thereof so as to be not more than the upper limit, the resin can be inhibited from suffering a decrease in transparency, a decrease in refractive index, a decrease in flexibility, etc. due to the addition of the antioxidant.

Examples of the antioxidant include 10-dihydro-9-oxa-10-phosphaphenanthrene 10-oxide.

Furthermore, the inorganic-organic composite composition of the invention may contain a solvent which is compatible with the curable monomers, from the standpoint of improving the viscosity or handleability.

(7) Light Transmittance of the Inorganic-Organic Composite Composition

The light transmittance of the inorganic-organic composite composition of the invention is a factor which considerably affects the transparency of the inorganic-organic hybrid material of the invention which is a cured object obtained by curing this inorganic-organic composite composition. The higher the light transmittance, the more the composition is preferred. Specifically, the inorganic-organic composite composition of the invention, when examined at an optical path length of 0.3 cm using light having a wavelength of 400 nm, has a light transmittance of generally 70% or higher, preferably 75% or higher.

By regulating the light transmittance of the inorganic-organic composite composition of the invention so as to be not less than the lower limit, an inorganic-organic hybrid material having excellent transparency can be obtained. This inorganic-organic hybrid material can be used to obtain an optical material which is capable of transmitting light to a distant place without attenuating the light.

The light transmittance of the inorganic-organic composite composition is measured by the method which will be described later in Examples.

4. Processes for Producing the Inorganic-organic Composite Composition

The inorganic-organic composite composition of the invention can be produced by mixing and dispersing inorganic particles or surface-treated inorganic particles which serve as the inorganic component described above, radiation-curable monomers as starting materials for a resin serving as the organic component to be combined therewith, a polymerization initiator, a sulfur-containing organic compound for improving flexibility and reducing yellowness, and various additives which are added according to need, by means of a high-speed mixer, sand mill, three-roll mill, or the like.

Examples of processes for the production include the following processes (1) to (3), but usable production processes should not be construed as being limited to the following.

(1) Inorganic particles are mixed with a solvent to form a slurry, and the resultant slurry is mixed with a surface-treating agent to obtain a transparent dispersion. This transparent dispersion is evenly mixed with radiation-curable monomers, and the solvent is distilled off to obtain a residue. Thereafter, the residue is mixed with a sulfur-containing organic compound. According to need, the resultant mixture is mixed with a polymerization initiator.

(2) Inorganic particles are mixed with a surface-treating agent in a solvent to obtain a solution A. Meanwhile, a mixture 1 of radiation-curable monomers and a sulfur-containing organic compound is mixed with the solution A to obtain a solution B.

The solution B is mixed with a polymerization initiator, and the solvent is thereafter distilled off to obtain a residue. Alternatively, the solvent may be removed from the solution B by distillation to obtain a residue, before the residue is mixed with a polymerization initiator according to need.

(3) Inorganic particles are mixed with a surface-treating agent to obtain a mixture 2. Meanwhile, radiation-curable monomers are mixed with a sulfur-containing organic compound in a solvent to obtain a solution C. The mixture 2 is mixed with the solution C to obtain a solution D.

The solution D is mixed with a polymerization initiator, and the solvent is thereafter distilled off to obtain a residue. Alternatively, the solvent may be removed from the solution D by distillation to obtain a residue, before the residue is mixed with a polymerization initiator according to need.

5. Molded Object of the Inorganic-Organic Hybrid Material and Molding Methods

In the case where the inorganic-organic composition of the invention thus produced is used to mold an inorganic-organic hybrid material which, for example, is in a film or sheet form, examples of molding methods include a method in which the inorganic-organic composite composition is applied in a desired thickness to a substrate by a technique such as spin coating, bar coating, spraying, or roll coating and the resultant coating film is irradiated with radiation such as ultraviolet rays, heat, or electron beams to thereby polymerize or condensation-polymerize the monomers. Alternatively, use may be made of a method in which the inorganic-organic composite composition is directly poured using a dispenser or the like into a portion where flexibility and a high refractive index are required, and the composition is thereafter irradiated with radiation to polymerize the monomers. As stated above, a solvent which is compatible with the curable monomers may be added to the uncured inorganic-organic composite composition for the purpose of improving the viscosity or handleability thereof.

Examples of methods for curing the inorganic-organic composite composition, from the standpoints of productivity, whether microprocessing is possible or not, etc., include photocuring (electromagnetic-wave curing) in which visible light, ultraviolet rays, infrared rays, or the like is used for curing and an electron-beam curing method in which electron-beam irradiation is conducted for curing. For example, in the case of curing by irradiation with ultraviolet rays, it is preferred to use a high-pressure mercury lamp, metal halide lamp, xenon lamp, UV-LED, or the like as an ultraviolet-ray lamp to cure the composition by irradiating ultraviolet rays at an irradiance of 30-3,000 mW/cm$^2$ and an integrated quantity of light of 10-10,000 mJ/cm$^2$. Such light or electron beams may be used in combination with the heat generated by infrared rays, hot air, high-frequency heating, or the like.

The inorganic-organic composite composition of the invention shows sufficient curability even in an air atmosphere. However, when the composition is cured with radiation in an oxygen-free atmosphere, not only curing inhibition by the oxygen present in the air is prevented but also the composition can be cured in a smaller integrated quantity of light. This curing in an oxygen-free atmosphere is hence more preferred.

6. Properties of the Inorganic-Organic Hybrid Material
<Refractive Index>

The inorganic-organic hybrid material of the invention is characterized by having a refractive index of 1.60 or higher. Although film type lightguide sheets and film type optical waveguides are required to have a high degree of flexibility, heat resistance is also required of these materials. The level of heat resistance varies depending on applications. Techniques usually employed for heightening heat resistance are to introduce aromatic rings into the molecular structure and to heighten the crosslink density of a curable resin. Consequently, to enhance the heat resistance of a resin results in an increase in the refractive index of the resin itself. Although examples of highly heat-resistant acrylates into which aromatic rings have been introduced usually include acrylates having naphthalene structures, fluorene structures, bisphenol A structures, or the like, these acrylates, in many cases, have a refractive index slightly lower than 1.6. Meanwhile, a structure for guiding light is required to have a multilayer structure including a low-refractive-index layer and a high-refractive-index layer, and it is preferred that the difference in refractive index between the two layers should be as large as possible.

Consequently, the refractive index of the inorganic-organic hybrid material of the invention must be at least 1.60.

In particular, the refractive index of the inorganic-organic hybrid material of the invention is 1.60 or higher, preferably 1.62 or higher. Since the inorganic-organic hybrid material of the invention has such a high refractive index, this hybrid material can be effectively used in applications where the material is used as a high-refractive-index optical material.

There is no particular upper limit on the refractive index of the inorganic-organic hybrid material of the invention. However, the refractive index thereof is generally 1.9 or less, because to heighten the refractive index reduces, rather than enhances, the flexibility.

Incidentally, the refractive index of the inorganic-organic hybrid material of the invention is a value measured with a refractometer using light having a wavelength of 589 nm, as will be described later in Examples.

<Flexibility>

The inorganic-organic hybrid material of the invention has given excellent flexibility and has the merits of having excellent tensile elongation and being less apt to break.

With respect to the degree of flexibility of the inorganic-organic hybrid material of the invention, the hybrid material has flexibility which is satisfactory to such a degree that when a strip specimen sheet having a thickness of 1,000 μm that is constituted only of the inorganic-organic hybrid material of the invention and has no substrate is wound on the peripheral surface of a cylindrical metal rod having a diameter of 10 mm, then the specimen does not crack.

Personal digital assistants and the like, in which size reductions proceed more and more in recent years, include structures for guiding light, from the standpoint of the degree of freedom of shape and the standpoint of design. These structures are used especially for efficiently guiding the light of LEDs to illuminate the key switch part or the like by means of a smaller number of LED chips or to display signs of different designs. However, the lightguide structures are bent so as to conform to shapes or are pushed together with the switch domes. Consequently, in order for a material to be used as such a sheet for guiding light, the material itself is required to have high flexibility.

For examining a material as to whether the material is capable of conforming to bending, etc. when actually used in an appliance, a mandrel test for evaluating coating films for cracking or adhesion is optimal. Specifically, a sheet specimen is wound on each of metal rods differing in diameter, and the diameter of a metal rod on which the test specimen can be wound without cracking is determined. The smaller the diameter of the metal rod (hereinafter often referred to as "bending-resistant diameter"), the higher the flexibility in bending.

In small personal digital assistants such as cell phones, an especially high degree of bending flexibility is necessary, and the bending-resistant diameter of the specimen sheet having a thickness of 1,000 m is generally 10 mm or less, preferably 5 mm or less, more preferably 2 mm or less. When the sheet has a bending-resistant diameter of 10 mm or less, this sheet can be easily bent, for example, in personal digital assistants or the like, in which size reductions and complication proceed. As a result, the inorganic-organic hybrid material sheet can be applied to such appliances without impairing the design or design attractiveness thereof and while enabling the appliances themselves to be sufficiently smaller and thinner.

The term "crack" as used herein for a specimen sheet wound on a metal rod means a phenomenon in which when the strip specimen sheet having a thickness of 1,000 µm is wound at ordinary temperature on the peripheral surface of a metal rod having a given diameter and is thereby bent at an angle of 180 degrees, this specimen sheet cracks into two or more pieces. There is no particular limitation on the size of the specimen sheet to be used here, so long as the specimen sheet has a thickness of 1,000 µm and is capable of being wound on the metal rod. However, the specimen sheet used here has a width (dimension of that part of the sheet which extends along the axial direction of the metal rod when the sheet has been wound on the metal rod) of generally 5 mm or more, e.g., 5-10 mm (in the Examples given later, the thickness is 1,000 µm and the width is 5 mm), and a length (dimension of that part of the sheet which extends along the peripheral direction of the metal rod when the sheet has been wound on the metal rod) of 70 mm.

<Total Light Transmittance>

The inorganic-organic hybrid material of the invention is not problematic so long as the hybrid material is transparent to light having wavelengths in a given range, such as visible light or near-infrared rays, and is flexible and has been colored little. From the standpoint of guiding light, however, the hybrid material has a light transmittance of generally 70% or higher, preferably 80% or higher, more preferably 85% or higher, in a wavelength range of 400-1,100 nm. It is especially preferred that the hybrid material, when having a film thickness of 0.5 mm, should have a total light transmittance of 80% or higher, more preferably 85% or higher, in a wavelength range of 400-1,100 nm.

As will be described later in the section Examples, the total light transmittance of an inorganic-organic hybrid material is determined by examining a specimen sheet having a thickness of 0.5 mm with a hazeometer in accordance with JIS K7361-1.

<Colorlessness>

In the case where the inorganic-organic hybrid material of the invention is to be used as a sheet for guiding light, it is important that not only the hybrid material should be transparent but also the light which has been guided should not have a yellow color due to the color of the material itself. A reduction in this coloration also is a subject to be accomplished by the invention.

In the invention, a reduction in the yellowness is attained, for example, by adding a thiol compound; this yellowness reduction is attained simultaneously with impartation of flexibility to the material.

The degree of yellowness of the inorganic-organic hybrid material of the invention can be evaluated through an examination in which a 0.5 mm-thick specimen sheet formed from the inorganic-organic hybrid material is examined with a spectrophotometer for transmittance with respect to each wavelength. Usually, in this examination, when the light which gave a transmittance of 70% has a wavelength (hereinafter often referred to as "70% wavelength") of 400 nm or less and when the difference between the wavelength of the light which gave a transmittance of 70% and the wavelength of the light which gave a transmittance of 80% (hereinafter, that difference is often referred to as "70-80% wavelength width") is as small as 50 nm or less, then this hybrid material can be considered to be transparent and colorless (have no yellowness).

Especially from the standpoints of transparency and colorlessness, it is preferred that the 70% wavelength should be 400 nm or less, in particular, 390 nm or less, and that the 70-80% wavelength width should be 50 nm or less, in particular, 40 nm or less.

<Mechanical Properties>

In the case where the inorganic-organic hybrid material of the invention is to be used, for example, as a material for guiding light, the hybrid material is required to have sufficient durability so as to withstand attachment to appliances or withstand stresses which generate after the attachment. Especially for use in portable small appliances such as telephones, mobile devices, and personal computers, which have a variety of functions including decoration by space-saving light guiding and communication through an optical wiring line, the hybrid material is required to be excellent in terms of flexibility, bendability, impact resistance, and cuttability so as to withstand processing and use.

Inorganic-organic hybrid materials hitherto have had the following problems. Although the refractive index can be improved by combining the organic material with inorganic particles, the resultant material is hard and brittle. Conversely, an improvement in flexibility results in a decrease in refractive index. Consequently, it has been impossible to make a material design which brings about a larger difference in refractive index with respect to general acrylic resins having heat resistance. With respect to the durability concerning stress, the material must not only be flexible but also have a high elongation when subjected to a tensile test.

The elongation of a material is measured in accordance with JIS K6251. Specifically, a dumbbell-shaped cured-resin specimen having a width of 5 mm, a distance between standard lines of 20 mm, and a thickness of 0.62 mm is produced, and this specimen is subjected to room-temperature stretching with a tensile tester (digital force gauge "ZP-500N" and electric stage "MX-500N-E", both manufactured by Imada Co., Ltd.) to determine the point of rupture of the material and the displacement amount which the material has undergone before the rupture point. The displacement amount is expressed in terms of percent based on the original length of the sample to thereby obtain the elongation.

It is preferred that the inorganic-organic hybrid material of the invention should be a material which, when evaluated in the manner described above, has a tensile elongation of generally 50% or higher, more preferably 80% or higher. The hybrid material having such tensile elongation not only shows improved handleability during processing, but also is capable of relaxing stresses due to shrinkage caused by temperature or due to deformation, etc.

7. Applications of the Inorganic-Organic Hybrid Material

According to the invention, flexibility can be imparted to an inorganic-organic hybrid material which inherently is hard and brittle, and it is possible to provide an inorganic-organic hybrid material which has been greatly improved with respect to impact resistance, bendability, brittleness, and cuttability and which is hence excellent in terms of high refractive index, flexibility, colorlessness, transparency, and mechanical properties and to further provide an optical material obtained using the hybrid material.

In the case where the inorganic-organic hybrid material of the invention is used in a film or sheet form as an optical material such as a lightguide sheet or an optical waveguide sheet, the thickness thereof varies depending on the size of the light source, the mode of optical coupling, etc. However, the hybrid material is used in a film or sheet form having a thickness which is generally 10 µm or more, preferably 20 µm or more, and is generally 1,000 µm or less, preferably 500 µm or less. When the thickness thereof is not less than the lower limit, it is easy to form boundaries for guiding the light emitted by a light source. By regulating the thickness thereof so as to be not larger than the upper limit, the proportion of the inorganic-organic hybrid material in the appliance to which the hybrid material is applied is rendered small, making it possible to attain reductions in the size and thickness of the appliance.

The inorganic-organic hybrid material of the invention having such properties is highly transparent in a wide wavelength range and can attain a high refractive index of 1.60 or above and flexibility, which are inconsistent functions. Consequently, it is possible to provide a film type lightguide sheet which is usable in personal digital assistants and the like that have a larger number of bent parts, and to provide an optical waveguide sheet which shows little light transmission loss even when bent.

Furthermore, since the inorganic-organic hybrid material of the invention combines a high refractive index and flexibility, the hybrid material is applicable also to functional films for forward scattering, reflection, light condensation, etc. for use in the display parts of flat panel displays (FPD) such as liquid-crystal displays (LCD), plasma display panels (PDP), electroluminescence displays (EL), and surface electric-field displays (SED).

Moreover, the inorganic-organic hybrid material of the invention can be applied also to lens sheets for use in the optical field, such as microarray lens sheets, prism sheets, Fresnel lenses, and lenticular lenses, and to diffusion films, holographic substrates, light modulation films, etc.

EXAMPLES

The invention will be explained below in more detail by reference to Examples and Comparative Examples, but the invention should not be construed as being limited by the following Examples.
<Inorganic Particles>
Zirconium oxide nanoparticles were synthesized as inorganic particles by the following method.

Into a 1-L three-necked flask was introduced 500 mL of benzyl alcohol (oxygen-containing organic solvent). Nitrogen bubbling was conducted for 30 minutes. While continuing the nitrogen bubbling, 116.7 g of a 70% by weight 1-propanol solution of zirconium propoxide (number of moles of the zirconium propoxide (metal oxide precursor)=0.25 mol) was added, and the contents were stirred for 30 minutes. Thereto was added 100.3 g of oleylamine (amine: 0.375 mol). The contents were stirred for further 30 minutes. The solution thus prepared (liquid reaction mixture) was subjected to 3-hour nitrogen bubbling and then introduced into a closable vessel made of stainless steel. This vessel was sealed and heated at 200° C. for 48 hours to obtain a milk-white slurry reaction mixture.

A 50-g portion of the milk-white slurry reaction mixture thus obtained was taken out, and a large excess of ethanol was added thereto to cause precipitation. This mixture was centrifuged to recover the precipitate. The precipitate recovered was washed with an ethanol/hexane mixed solvent six times, and was then recovered and dried to obtain zirconium oxide in a white powder form.

The zirconium oxide obtained was examined for crystallinity and primary-particle diameter by X-ray diffractometry and an examination with a transmission electron microscope.

The crystallite diameter was calculated from the half-value width of the (111)-plane peak appearing at around $2\theta=30$ in X-ray diffractometry, using the Scherrer equation described above.

As a result, it was found that when the amount of zirconium oxide calculated from the number of moles of the zirconium propoxide which had been fed was taken as 100%, the yield of the synthesized product was 80%, and it was ascertained that the zirconium oxide obtained had a crystallite diameter of 3-4 nm.

This zirconium oxide (hereinafter referred to as "zirconium oxide I") was used and combined with various monomers in the manners shown below to obtain inorganic-organic composite compositions. These compositions were cured with UV to produce inorganic-organic hybrid materials.

Incidentally, the refractive index of zirconium oxide is 2.17 according to the document *Tōmei Purasuchikku No Saizensen*, edited by The Society of Polymer Science, Japan (NTS Inc.), and is 2.1-2.2 according to *Nyū Seramikkusu Funtai Handobukku* (Science Forum Inc.).

In the Examples and Comparative Examples given below, the following ingredients for inorganic-organic composite compositions were used besides the zirconium oxide.
<Radiation-Curable Monomers>
(Monofunctional Raidation-Curable Monomers>
Hydroxyethylated o-phenylphenol acrylate: "NK Ester A-LEN-10", manufactured by Shin-Nakamura Chemical Co., Ltd.
2-Methacryloyloxyethyl acid phosphate: "Light Ester P-2M", manufactured by Kyoeisha Chemical Co., Ltd.
Acrylic Acid
(Multifunctional Radiation-Curable Monomers)
Bisphenol A diglycidyl diacrylate: manufactured by Aldrich Co.
Fluorene-based bifunctional acrylate: "Ogsol EA-0200", manufactured by Osaka Gas Chemicals Co., Ltd.
Polypropylene glycol diacrylate: "NK Ester APG-400", manufactured by Shin-Nakamura Chemical Co., Ltd.
<Thiol Compounds>
Trimethylolpropane tris(3-mercaptopropionate): "TMMP", manufactured by SC Organic Chemical Co., Ltd.
Pentaerythritol tetrakis(3-mercaptopropionate): "PEMP", manufactured by SC Organic Chemical Co., Ltd.
Dipentaerythritol hexakis(3-mercaptopropionate): "DPMP", manufactured by SC Organic Chemical Co., Ltd.
<Polymerization Initiator>
1-Hydroxycyclohexyl phenyl ketone: "Luna 200", manufactured by Nihon Siber Hegner K.K.
<Antioxidant>
10-Dihydro-9-oxa-10-phosphaphenanthrene 10-oxide: manufactured by Tokyo Kasei Co., Ltd.

The inorganic particles were mixed with radiation-curable monomers, a thiol compound, the antioxidant, and the polymerization initiator in accordance with each of the recipes shown in Table 2 to prepare an inorganic-organic composite composition. In the following explanation, the amount of each substance is given in parts by weight. In Table 2, however, the amount of each substance is given in terms of % by mass based on the solid components of each inorganic-organic composite composition.

The light transmittance of each inorganic-organic composite composition obtained was measured by the following method.

<Method for Measuring Light Transmittance>

The inorganic-organic composite composition was filled into a quartz cell having an optical path length of 0.3 cm and examined with ultraviolet and visible absorption spectrum analyzer "UV-1600PC" (manufactured by Shimadzu Corp.). Air was used as a reference, and the measuring wavelength was set at 400 nm.

Example 1

A portion of the milk-white slurry reaction mixture obtained by the synthesis of inorganic particles was taken out, and a large excess of ethanol was added thereto to cause precipitation. This mixture was centrifuged to recover the precipitate. The precipitate recovered was washed with an ethanol/hexane mixed solvent six times and then recovered. Thus, a white precipitate which contained 27.5 parts by weight of zirconium oxide was obtained.

To this white precipitate were added 30 parts by weight of tetrahydroxyfuran and 12.1 parts by weight of 2-methacryloyloxyethyl acid phosphate (Light Ester P-2M, manufactured by Kyoeisha Chemical Co., Ltd.). This mixture was stirred and mixed at room temperature for 1 hour to obtain a colorless transparent liquid. Furthermore, 34.4 parts by weight of a hydroxyethylated o-phenylphenol acrylate (NK Ester A-LEN-10, manufactured by Shin-Nakamura Chemical Co., Ltd.), 15.6 parts by weight of bisphenol A diglycidyl diacrylate (manufactured by Aldrich Co.), and 1.5 parts by weight of 10-dihydro-9-oxa-10-phosphaphenanthrene 10-oxide (manufactured by Tokyo Kasei Co., Ltd.) as an antioxidant were added thereto, and the resultant mixture was stirred and mixed at room temperature for 1 hour to obtain a colorless transparent liquid.

This colorless transparent liquid was subjected to vacuum concentration under the conditions of 30 Torr and 40° C. to remove the solvent. Thus, a colorless transparent dispersion of zirconium oxide particles was obtained. To this dispersion were added 10.4 parts by weight (2.4% by mass in terms of sulfur atom amount) of trimethylolpropane tris(3-mercaptopropionate) (TMMP, manufactured by SC Organic Chemical Co., Ltd.) and 2.7 parts by weight of 1-hydroxycyclohexyl phenyl ketone (Luna 200, manufactured by Nihon Siber Hegner K.K.) as a polymerization initiator. The resultant mixture was evenly stirred and mixed using a planetary centrifugal mixer (manufactured by Thinky Corp.) at 2,000 rpm to obtain an inorganic-organic composite composition. The inorganic-organic composite composition obtained had a light transmittance of 77%.

Example 2

A portion of the milk-white slurry reaction mixture obtained by the synthesis of inorganic particles was taken out, and a large excess of ethanol was added thereto to cause precipitation. This mixture was centrifuged to recover the precipitate. The precipitate recovered was washed with an ethanol/hexane mixed solvent six times and then recovered. Thus, a white precipitate which contained 24.4 parts by weight of zirconium oxide was obtained.

To this white precipitate were added 30 parts by weight of tetrahydroxyfuran and 10.7 parts by weight of 2-methacryloyloxyethyl acid phosphate (Light Ester P-2M, manufactured by Kyoeisha Chemical Co., Ltd.). This mixture was stirred and mixed at room temperature for 1 hour to obtain a colorless transparent liquid. Furthermore, 30.4 parts by weight of a hydroxyethylated o-phenylphenol acrylate (NK Ester A-LEN-10, manufactured by Shin-Nakamura Chemical Co., Ltd.) and 13.8 parts by weight of bisphenol A diglycidyl diacrylate (manufactured by Aldrich Co.) as curable monomers and 1.3 parts by weight of 10-dihydro-9-oxa-10-phosphaphenanthrene 10-oxide (manufactured by Tokyo Kasei Co., Ltd.) as an additive were added thereto, and the resultant mixture was stirred and mixed at room temperature for 1 hour to obtain a colorless transparent liquid.

This colorless transparent liquid was subjected to vacuum concentration under the conditions of 30 Torr and 40° C. to remove the solvent. Thus, a colorless transparent dispersion of zirconium oxide particles was obtained. To this dispersion were added 20.7 parts by weight (4.8% by mass in terms of sulfur amount) of trimethylolpropane tris(3-mercaptopropionate) (TMMP, manufactured by SC Organic Chemical Co., Ltd.) and 2.4 parts by weight of 1-hydroxycyclohexyl phenyl ketone (Luna 200, manufactured by Nihon Siber Hegner K.K.) as a polymerization initiator. The resultant mixture was evenly stirred and mixed using a planetary centrifugal mixer (manufactured by Thinky Corp.) at 2,000 rpm to obtain an inorganic-organic composite composition. The inorganic-organic composite composition obtained had a light transmittance of 78%.

Example 3

A portion of the milk-white slurry reaction mixture obtained by the synthesis of inorganic particles was taken out, and a large excess of ethanol was added thereto to cause precipitation. This mixture was centrifuged to recover the precipitate. The precipitate recovered was washed with an ethanol/hexane mixed solvent six times and then recovered. Thus, a white precipitate which contained 26.3 parts by weight of zirconium oxide was obtained.

To this white precipitate were added 30 parts by weight of tetrahydroxyfuran, 2.6 parts by weight of 2-methacryloyloxyethyl acid phosphate (Light Ester P-2M, manufactured by Kyoeisha Chemical Co., Ltd.), and 10.5 parts by weight of acrylic acid. This mixture was stirred and mixed at room temperature for 1 hour to obtain a colorless transparent liquid. Furthermore, 29.8 parts by weight of a hydroxyethylated o-phenylphenol acrylate (NK Ester A-LEN-10, manufactured by Shin-Nakamura Chemical Co., Ltd.) and 14.9 parts by weight of a fluorene-based bifunctional acrylate (Ogsol EA-0200, manufactured by Osaka Gas Chemicals Co., Ltd.) as curable monomers and 2.6 parts by weight of 10-dihydro-9-oxa-10-phosphaphenanthrene 10-oxide (manufactured by Tokyo Kasei Co., Ltd.) as an additive were added thereto, and the resultant mixture was stirred and mixed at room temperature for 1 hour to obtain a colorless transparent liquid.

This colorless transparent liquid was subjected to vacuum concentration under the conditions of 30 Torr and 40° C. to remove the solvent. Thus, a colorless transparent dispersion of zirconium oxide particles was obtained. To this dispersion were added 15.8 parts by weight (3.9% by mass in terms of sulfur amount) of pentaerythritol tetrakis(3-mercaptopropionate) (PEMP, manufactured by SC Organic Chemical Co., Ltd.) and 2.6 parts by weight of 1-hydroxycyclohexyl phenyl ketone (Luna 200, manufactured by Nihon Siber Hegner K.K.) as a polymerization initiator. The resultant mixture was evenly stirred and mixed using a planetary centrifugal mixer (manufactured by Thinky Corp.) at 2,000 rpm to obtain an inorganic-organic composite composition. The inorganic-organic composite composition obtained had substantially the same light transmittance as in Example 2.

Example 4

A portion of the milk-white slurry reaction mixture obtained by the synthesis of inorganic particles was taken out, and a large excess of ethanol was added thereto to cause precipitation. This mixture was centrifuged to recover the precipitate. The precipitate recovered was washed with an ethanol/hexane mixed solvent six times and then recovered. Thus, a white precipitate which contained 26.3 parts by weight of zirconium oxide was obtained.

To this white precipitate were added 30 parts by weight of tetrahydroxyfuran, 2.6 parts by weight of 2-methacryloyloxyethyl acid phosphate (Light Ester P-2M, manufactured by Kyoeisha Chemical Co., Ltd.), and 10.5 parts by weight of acrylic acid. This mixture was stirred and mixed at room temperature for 1 hour to obtain a colorless transparent liquid. Furthermore, 29.8 parts by weight of a hydroxyethylated o-phenylphenol acrylate (NK Ester A-LEN-10, manufactured by Shin-Nakamura Chemical Co., Ltd.) and 14.9 parts by weight of a fluorene-based bifunctional acrylate (Ogsol EA-0200, manufactured by Osaka Gas Chemicals Co., Ltd.) as curable monomers and 2.6 parts by weight of 10-dihydro-9-oxa-10-phosphaphenanthrene 10-oxide (manufactured by Tokyo Kasei Co., Ltd.) as an additive were added thereto, and the resultant mixture was stirred and mixed at room temperature for 1 hour to obtain a colorless transparent liquid.

This colorless transparent liquid was subjected to vacuum concentration under the conditions of 30 Torr and 40° C. to remove the solvent. Thus, a colorless transparent dispersion of zirconium oxide particles was obtained. To this dispersion were added 15.9 parts by weight (3.7% by mass in terms of sulfur amount) of dipentaerythritol hexakis(3-mercaptopropionate) (DPMP, manufactured by SC Organic Chemical Co., Ltd.) and 2.6 parts by weight of 1-hydroxycyclohexyl phenyl ketone (Luna 200, manufactured by Nihon Siber Hegner K.K.) as a polymerization initiator. The resultant mixture was evenly stirred and mixed using a planetary centrifugal mixer (manufactured by Thinky Corp.) at 2,000 rpm to obtain an inorganic-organic composite composition. The inorganic-organic composite composition obtained had substantially the same light transmittance as in Example 2.

Comparative Example 1

A portion of the milk-white slurry reaction mixture obtained by the synthesis of inorganic particles was taken out, and a large excess of ethanol was added thereto to cause precipitation. This mixture was centrifuged to recover the precipitate. The precipitate recovered was washed with an ethanol/hexane mixed solvent six times and then recovered. Thus, a white precipitate which contained 27.5 parts by weight of zirconium oxide was obtained.

To this white precipitate were added 30 parts by weight of tetrahydroxyfuran and 12.1 parts by weight of 2-methacryloyloxyethyl acid phosphate (Light Ester P-2M, manufactured by Kyoeisha Chemical Co., Ltd.). This mixture was stirred and mixed at room temperature for 1 hour to obtain a colorless transparent liquid. Furthermore, 44.8 parts by weight of a hydroxyethylated o-phenylphenol acrylate (NK Ester A-LEN-10, manufactured by Shin-Nakamura Chemical Co., Ltd.) and 15.6 parts by weight of bisphenol A diglycidyl diacrylate (manufactured by Aldrich Co.) as curable monomers and 1.5 parts by weight of 10-dihydro-9-oxa-10-phosphaphenanthrene 10-oxide (manufactured by Tokyo Kasei Co., Ltd.) as an additive were added thereto, and the resultant mixture was stirred and mixed at room temperature for 1 hour to obtain a colorless transparent liquid.

This colorless transparent liquid was subjected to vacuum concentration under the conditions of 30 Torr and 40° C. to remove the solvent. Thus, a colorless transparent dispersion of zirconium oxide particles was obtained. To this dispersion was added 2.7 parts by weight of 1-hydroxycyclohexyl phenyl ketone (Luna 200, manufactured by Nihon Siber Hegner K.K.) as a polymerization initiator. The resultant mixture was evenly stirred and mixed using a planetary centrifugal mixer (manufactured by Thinky Corp.) at 2,000 rpm to obtain an inorganic-organic composite composition. The inorganic-organic composite composition obtained had a light transmittance of 78%.

Comparative Example 2

A portion of the milk-white slurry reaction mixture obtained by the synthesis of inorganic particles was taken out, and a large excess of ethanol was added thereto to cause precipitation. This mixture was centrifuged to recover the precipitate. The precipitate recovered was washed with an ethanol/hexane mixed solvent six times and then recovered. Thus, a white precipitate which contained 25.1 parts by weight of zirconium oxide was obtained.

To this white precipitate were added 30 parts by weight of tetrahydroxyfuran and 11.1 parts by weight of 2-methacryloyloxyethyl acid phosphate (Light Ester P-2M, manufactured by Kyoeisha Chemical Co., Ltd.). This mixture was stirred and mixed at room temperature for 1 hour to obtain a colorless transparent liquid. Furthermore, 28.5 parts by weight of a hydroxyethylated o-phenylphenol acrylate (NK Ester A-LEN-10, manufactured by Shin-Nakamura Chemical Co., Ltd.), 14.2 parts by weight of bisphenol A diglycidyl diacrylate (manufactured by Aldrich Co.), and 21.1 parts by weight of polypropylene glycol diacrylate (NK Ester APG-400, manufactured by Shin-Nakamura Chemical Co., Ltd.) as curable monomers and 1.4 parts by weight of 10-dihydro-9-oxa-10-phosphaphenanthrene 10-oxide (manufactured by Tokyo Kasei Co., Ltd.) as an additive were added thereto, and the resultant mixture was stirred and mixed at room temperature for 1 hour to obtain a colorless transparent liquid.

This colorless transparent liquid was subjected to vacuum concentration under the conditions of 30 Torr and 40° C. to remove the solvent. Thus, a colorless transparent dispersion of zirconium oxide particles was obtained. To this dispersion was added 2.5 parts by weight of 1-hydroxycyclohexyl phenyl ketone (Luna 200, manufactured by Nihon Siber Hegner K.K.) as a polymerization initiator. The resultant mixture was evenly stirred and mixed using a planetary centrifugal mixer (manufactured by Thinky Corp.) at 2,000 rpm to obtain an inorganic-organic composite composition. The inorganic-organic composite composition obtained had a light transmittance of 78%.

Comparative Example 3

A portion of the milk-white slurry reaction mixture obtained by the synthesis of inorganic particles was taken out, and a large excess of ethanol was added thereto to cause precipitation. This mixture was centrifuged to recover the precipitate. The precipitate recovered was washed with an ethanol/hexane mixed solvent six times and then recovered. Thus, a white precipitate which contained 26.3 parts by weight of zirconium oxide was obtained.

To this white precipitate were added 30 parts by weight of tetrahydroxyfuran, 2.6 parts by weight of 2-methacryloyloxyethyl acid phosphate (Light Ester P-2M, manufactured by Kyoeisha Chemical Co., Ltd.), and 10.5 parts by weight of acrylic acid. This mixture was stirred and mixed at room temperature for 1 hour to obtain a colorless transparent liquid. Furthermore, 45.7 parts by weight of a hydroxyethylated o-phenylphenol acrylate (NK Ester A-LEN-10, manufactured by Shin-Nakamura Chemical Co., Ltd.) and 14.9 parts by weight of a fluorene-based bifunctional acrylate (Ogsol EA-0200, manufactured by Osaka Gas Chemicals Co., Ltd.) as curable monomers and 2.6 parts by weight of 10-dihydro-9-oxa-10-phosphaphenanthrene 10-oxide (manufactured by Tokyo Kasei Co., Ltd.) as an additive were added thereto, and the resultant mixture was stirred and mixed at room temperature for 1 hour to obtain a colorless transparent liquid.

This colorless transparent liquid was subjected to vacuum concentration under the conditions of 30 Torr and 40° C. to remove the solvent. Thus, a colorless transparent dispersion of zirconium oxide particles was obtained. To this dispersion was added 2.6 parts by weight of 1-hydroxycyclohexyl phenyl ketone (Luna 200, manufactured by Nihon Siber Hegner K.K.) as a polymerization initiator. The resultant mixture was evenly stirred and mixed using a planetary centrifugal mixer (manufactured by Thinky Corp.) at 2,000 rpm to obtain an inorganic-organic composite composition. The inorganic-organic composite composition obtained had substantially the same light transmittance as in Comparative Example 2.

Comparative Example 4

A portion of the milk-white slurry reaction mixture obtained by the synthesis of inorganic particles was taken out, and a large excess of ethanol was added thereto to cause precipitation. This mixture was centrifuged to recover the precipitate. The precipitate recovered was washed with an ethanol/hexane mixed solvent six times and then recovered. Thus, a white precipitate which contained 29.6 parts by weight of zirconium oxide was obtained.

To this white precipitate were added 30 parts by weight of tetrahydroxyfuran, 3.0 parts by weight of 2-methacryloyloxyethyl acid phosphate (Light Ester P-2M, manufactured by Kyoeisha Chemical Co., Ltd.), and 11.8 parts by weight of acrylic acid. This mixture was stirred and mixed at room temperature for 1 hour to obtain a colorless transparent liquid. Furthermore, 33.5 parts by weight of a hydroxyethylated o-phenylphenol acrylate (NK Ester A-LEN-10, manufactured by Shin-Nakamura Chemical Co., Ltd.) and 16.8 parts by weight of a fluorene-based bifunctional acrylate (Ogsol EA-0200, manufactured by Osaka Gas Chemicals Co., Ltd.) as curable monomers and 3.0 parts by weight of 10-dihydro-9-oxa-10-phosphaphenanthrene 10-oxide (manufactured by Tokyo Kasei Co., Ltd.) as an additive were added thereto, and the resultant mixture was stirred and mixed at room temperature for 1 hour to obtain a colorless transparent liquid.

This colorless transparent liquid was subjected to vacuum concentration under the conditions of 30 Torr and 40° C. to remove the solvent. Thus, a colorless transparent dispersion of zirconium oxide particles was obtained. To this dispersion were added 5.4 parts by weight (1.2% by mass in terms of sulfur amount) of trimethylolpropane tris(3-mercaptopropionate) (TMMP, manufactured by SC Organic Chemical Co., Ltd.) and 3.0 parts by weight of 1-hydroxycyclohexyl phenyl ketone (Luna 200, manufactured by Nihon Siber Hegner K.K.) as a polymerization initiator. The resultant mixture was evenly stirred and mixed using a planetary centrifugal mixer (manufactured by Thinky Corp.) at 2,000 rpm to obtain an inorganic-organic composite composition. The inorganic-organic composite composition obtained had substantially the same light transmittance as in Comparative Example 2.

Comparative Example 5

A portion of the milk-white slurry reaction mixture obtained by the synthesis of inorganic particles was taken out, and a large excess of ethanol was added thereto to cause precipitation. This mixture was centrifuged to recover the precipitate. The precipitate recovered was washed with an ethanol/hexane mixed solvent six times and then recovered. Thus, a white precipitate which contained 30.4 parts by weight of zirconium oxide was obtained.

To this white precipitate were added 30 parts by weight of tetrahydroxyfuran, 3.0 parts by weight of 2-methacryloyloxyethyl acid phosphate (Light Ester P-2M, manufactured by Kyoeisha Chemical Co., Ltd.), and 12.2 parts by weight of acrylic acid. This mixture was stirred and mixed at room temperature for 1 hour to obtain a colorless transparent liquid. Furthermore, 34.5 parts by weight of a hydroxyethylated o-phenylphenol acrylate (NK Ester A-LEN-10, manufactured by Shin-Nakamura Chemical Co., Ltd.) and 17.2 parts by weight of a fluorene-based bifunctional acrylate (Ogsol EA-0200, manufactured by Osaka Gas Chemicals Co., Ltd.) as curable monomers and 3.0 parts by weight of 10-dihydro-9-oxa-10-phosphaphenanthrene 10-oxide (manufactured by Tokyo Kasei Co., Ltd.) as an additive were added thereto, and the resultant mixture was stirred and mixed at room temperature for 1 hour to obtain a colorless transparent liquid.

This colorless transparent liquid was subjected to vacuum concentration under the conditions of 30 Torr and 40° C. to remove the solvent. Thus, a colorless transparent dispersion of zirconium oxide particles was obtained. To this dispersion were added 2.7 parts by weight (0.6% by mass in terms of sulfur amount) of trimethylolpropane tris(3-mercaptopropionate) (TMMP, manufactured by SC Organic Chemical Co., Ltd.) and 3.1 parts by weight of 1-hydroxycyclohexyl phenyl ketone (Luna 200, manufactured by Nihon Siber Hegner K.K.) as a polymerization initiator. The resultant mixture was evenly stirred and mixed using a planetary centrifugal mixer (manufactured by Thinky Corp.) at 2,000 rpm to obtain an inorganic-organic composite composition. The inorganic-organic composite composition obtained had substantially the same light transmittance as in Comparative Example 2.

TABLE 2

| | Components | | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|---|---|
| Recipe of inorganic- | Inorganic particles | Zirconium oxide I | 26.4 | 23.5 | 25 | 25 | 26.4 | 24.2 | 25 | 27.9 | 28.6 |

TABLE 2-continued

| | Components | | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|---|---|
| organic composite composition (mass %) | Monofunctional radiation-curable monomers | Hydroxyethylated o-phenylphenol acrylate | 33.0 | 29.3 | 28.3 | 28.3 | 43.0 | 27.4 | 43.4 | 31.6 | 32.5 |
| | | 2-Methacryloyloxyethyl acid phosphate | 11.6 | 10.3 | 2.5 | 2.5 | 11.6 | 10.6 | 2.5 | 2.8 | 2.9 |
| | | Acrylic acid | — | — | 10 | 10 | — | — | 10 | 11.2 | 11.5 |
| | Multifunctional radiation-curable monomers | Bisphenol A diglycidyl diacrylate | 15.0 | 13.3 | — | — | 15.0 | 13.7 | — | — | — |
| | | Fluorene-based bifunctional acrylate | — | — | 14.2 | 2 | — | — | 14.1 | 15.8 | 16.2 |
| | | Polypropylene glycol diacrylate | — | — | — | — | — | 20.3 | — | — | — |
| | Thiol compounds | TMMP | 10.0 | 20.0 | — | — | — | — | — | 5.1 | 2.5 |
| | | PEMP | — | — | 15 | — | — | — | — | — | — |
| | | DPMP | — | — | — | 15.1 | — | — | — | — | — |
| | Antioxidant | 10-Dihydro-9-oxa-10-phosphaphenanthrene 10-oxide | 1.4 | 1.3 | 2.5 | 2.5 | 1.4 | 1.4 | 2.5 | 2.8 | 2.9 |
| | Polymerization initiator | 1-Hydroxycyclohexyl phenyl ketone | 2.6 | 2.3 | 2.5 | 2.5 | 2.7 | 2.4 | 2.5 | 2.8 | 2.9 |
| Sulfur atom content of inorganic-organic composite composition (mass %) | | | 2.4 | 4.8 | 4.0 | 3.7 | 0 | 0 | 0 | 1.2 | 0.6 |

Subsequently, the inorganic-organic composite compositions obtained were irradiated with ultraviolet rays at an irradiance of 100 mW/cm$^2$ and an integrated quantity of light of 350 mJ/cm$^2$ using a high-pressure mercury lamp (manufactured by Eye Graphics Co., Ltd.) in an oxygen-free atmosphere to obtain cured-object (inorganic-organic hybrid material) specimens respectively having given dimensions.

[Evaluation Items and Evaluation Methods]

The inorganic-organic hybrid material specimens obtained were examined for the following properties. The results thereof are shown in Table 3.

1) Flexibility Test

Strip specimens each having a thickness of 1,000 μm, width of 5 mm, and length of 70 mm were wound at room temperature (25° C.) respectively on cylindrical metal rods differing in diameter (the diameters were 1 mm, 2 mm, 3 mm, 4 mm, 5 mm, 6 mm, 8 mm, 10 mm, 15 mm, 20 mm, 25 mm, and 35 mm), and the state of the specimens was examined. The term "wound" used in this test method means that each specimen is in the state of being in close contact with a half of the circumference of the metal rod (in contact with a portion of the circumference which corresponds to 1800 with respect to the center of the metal rod).

Of the diameters (rod diameters) of the metal rods on which the specimens wound thereon did not crack, the minimum value (bending-resistant diameter) was taken as a value for evaluating the flexibility. The expression "does not crack" as used in this test method means that the specimen, at the time when the winding is completed, is in the state of having not separated into two or more pieces on the circumference of the metal rod. The smaller the value, the better the flexibility.

2) Total Light Transmittance

A specimen having a thickness of 0.5 mm was examined for total light transmittance with hazeometer NDH-2000 (manufactured by Nippon Denshoku Kogyo K.K.) in accordance with JIS K7361-1.

3) Spectral Transmittance

A specimen having a thickness of 0.5 mm was produced and examined for spectral transmittance with ultraviolet and visible absorption spectrum analyzer "UV-1600PC" (manufactured by Shimadzu Corp.). In this spectral transmittance examination, the wavelength of the light which gave a transmittance of 70% (70% wavelength) and the difference in wavelength between the light which gave a transmittance of 70% and the light which gave a transmittance of 80% (70-80% wavelength width) were determined.

4) Refractive Index

A specimen having dimensions of 10 mm (width)×35 mm (length)×0.5 mm (thickness) was produced and examined for refractive index at a wavelength of 589 nm with an Abbe refractometer ("DR-M4", manufactured by Atago Co., Ltd.).

5) Tensile Elongation (Brittleness)

In accordance with JIS K6251, a dumbbell-shaped (shape No. 3) cured-resin specimen having a width of 5 mm, a distance between standard lines of 20 mm, and a thickness of 0.62 mm was produced and tested using a tensile tester (digital force gauge "ZP-500N" and electric stage "MX-500N-E", both manufactured by Imada Co., Ltd.) under the conditions of a stretching speed of 50 mm/min to determine the tensile elongation.

TABLE 3

Results of evaluation of inorganic-organic hybrid material

| | Bending-resistant diameter (mm) | Total light transmittance (%) | Spectral transmittance | | Refractive index | Tensile elongation (%) |
| | | | 70% wavelength (nm) | 70-80% wavelength width (nm) | | |
|---|---|---|---|---|---|---|
| Example 1 | 2 | 88.5 | 382 | 35 | 1.611 | 81.6 |
| Example 2 | 1 | 85.8 | 380 | 14 | 1.600 | 106.3 |
| Example 3 | 1 | 87.8 | 384 | 37 | 1.617 | 99.0 |

TABLE 3-continued

Results of evaluation of inorganic-organic hybrid material

| | Bending-resistant diameter (mm) | Total light transmittance (%) | Spectral transmittance 70% wavelength (nm) | Spectral transmittance 70-80% wavelength width (nm) | Refractive index | Tensile elongation (%) |
|---|---|---|---|---|---|---|
| Example 4 | 1 | 87.7 | 389 | 46 | 1.619 | 104.0 |
| Comparative Example 1 | 15 | 86.7 | 385 | 62 | 1.619 | 13.1 |
| Comparative Example 2 | 15 | 89.2 | 392 | 99 | 1.584 | 10.7 |
| Comparative Example 3 | 15 | 85.7 | 403 | 111 | 1.625 | 18.9 |
| Comparative Example 4 | 15 | 88.0 | 387 | 45 | 1.625 | 8.8 |
| Comparative Example 5 | 15 | 87.3 | 392 | 55 | 1.630 | 8.5 |

These evaluation results show that the inorganic-organic hybrid materials of Examples 1 to 4 have high transparency and a refractive index of 1.60 or higher, and that these hybrid materials are excellent in terms of flexibility and tensile elongation and, hence, have no problem concerning brittleness. It can be further seen that the addition of a thiol compound not only improves the flexibility but also makes it possible to reduce the yellowness of the inorganic-organic hybrid materials.

In contrast, it can be seen that in Comparative Examples 1 to 3, in which the composite compositions contained no thiol compound, and Comparative Examples 4 and 5, in which the composite compositions had a thiol compound content as low as below 1.5% by mass in terms of sulfur atom amount, a reduction in yellowness and improvements in flexibility and tensile elongation are not attained although it is possible to attain both an increase in refractive index and transparency.

It can be seen from the results given above that the inorganic-organic composite composition according to the invention is suitable for use in producing the inorganic-organic hybrid material according to the invention, and that the inorganic-organic hybrid material according to the invention is useful as optical materials required to have impact resistance, etc., such as lightguide sheets and optical waveguide sheets.

While the invention has been described in detail and with reference to specific embodiments thereof, it will be apparent to one skilled in the art that various changes and modifications can be made therein without departing from the spirit and scope thereof. This application is based on a Japanese patent application filed on Jun. 23, 2010 (Application No. 2010-142785), the contents thereof being incorporated herein by reference.

INDUSTRIAL APPLICABILITY

The inorganic-organic hybrid material of the invention is a flexible high-refractive-index transparent material obtained by evenly dispersing, for example, metal oxide nanoparticles having a particle diameter of 1-10 nm as an inorganic component to thereby not only enable the composite material to have a heightened refractive index while retaining the transparency but also attain impartation of flexibility, which has hitherto been a problem. Furthermore, by adding a thiol compound in a specific proportion, the yellowness which is another problem that is encountered when inorganic particles are combined in a large amount can be reduced and functions which have been unable to be simultaneously attained, such as high transparency, a high refractive index, high flexibility, and colorlessness, can be attained.

The inorganic-organic hybrid material of the invention, which has such properties, can be easily molded into complicated or unusual shapes, such as the displays of portable digital assistants, in which function advancement proceeds, optical lenses, microlenses, switches, lightguide sheets, lightguide plates, and optical waveguide sheets, and can be effectively used in applications where conformability is required and in applications where durability in terms of repetitions, e.g., keybutton pushing, is required.

The invention claimed is:

1. An inorganic-organic composite composition comprising:
    radiation-curable monomers;
    inorganic particles having a crystallite diameter, as calculated from the half-value width of a crystalline peak determined by X-ray diffractometry, of 1-10 nm; and
    an organic compound comprising a thiol group,
    wherein the radiation-curable monomers comprise a monofunctional radiation-curable monomer and a multifunctional radiation-curable monomer, and the content of the organic compound comprising a thiol group is 1.5-10% by mass of the inorganic-organic composite composition, in terms of sulfur atom amount.

2. The inorganic-organic composite composition according to claim 1, wherein the content of the inorganic particles is 20-80% by mass based on the solid components of the composition.

3. The inorganic-organic composite composition according to claim 1, wherein the proportion of the monofunctional radiation-curable monomer in the radiation-curable monomers is 1-95% by mass.

4. The inorganic-organic composite composition according to claim 1, wherein the radiation-curable monomers include at least one monomer selected from the group consisting of an acrylic monomer, a methacrylic monomer, an epoxy monomer, and a silicone monomer.

5. The inorganic-organic composite composition according to claim 1, wherein the content of the organic compound comprising a thiol group is 2.0-9% by mass of the inorganic-organic composite composition, in terms of sulfur atom amount.

6. The inorganic-organic composite composition according to claim 1, wherein the content of the organic compound comprising a thiol group is 3.5-8% by mass of the inorganic-organic composite composition, in terms of sulfur atom amount.

7. The inorganic-organic composite composition according to claim 1, wherein the organic compound comprises more than one thiol group.

8. The inorganic-organic composite composition according to claim 1, wherein the proportion of the monofunctional radiation-curable monomer in the radiation-curable monomers is 10-90% by mass.

9. The inorganic-organic composite composition according to claim 1, wherein the proportion of the monofunctional radiation-curable monomer in the radiation-curable monomers is 30-80% by mass.

10. An inorganic-organic hybrid material obtained by curing the inorganic-organic composite composition according to claim 1.

11. The inorganic-organic hybrid material according to claim 10, which has a refractive index of 1.60 or higher, in which when preparing a strip specimen having a thickness of 1,000 μm, a width of 5 mm and a length of 70 mm by using the inorganic-organic hybrid material and winding the specimen by 180° on a cylindrical metal rod having a diameter of 10 mm at 25° C., the specimen does not crack.

12. An optical material which comprises the inorganic-organic hybrid material according to claim 10.

13. A lightguide sheet which comprises the inorganic-organic hybrid material according to claim 10.

14. An optical waveguide sheet which comprises the inorganic-organic hybrid material according to claim 10.

* * * * *